(12) United States Patent
Mantovani et al.

(10) Patent No.: US 10,557,720 B2
(45) Date of Patent: Feb. 11, 2020

(54) UNAUTHORIZED ELECTRICAL GRID CONNECTION DETECTION AND CHARACTERIZATION SYSTEM AND METHOD

(71) Applicant: PACIFIC GAS AND ELECTRIC COMPANY, San Francisco, CA (US)

(72) Inventors: Fabio Mantovani, Richmond, CA (US); Ankit Jain, Oakland, CA (US); Marshall Blundell, Brooklyn, NY (US); Adriana Ciccone, San Francisco, CA (US); Jenny Gai, San Francisco, CA (US); Josh Bode, Pleasant Hill, CA (US); Tingwen Bao, Redwood City, CA (US)

(73) Assignee: PACIFIC GAS AND ELECTRIC COMPANY, San Francisco, CA (US)

( * ) Notice: Subject to any disclaimer, the term of this patent is extended or adjusted under 35 U.S.C. 154(b) by 174 days.

(21) Appl. No.: 15/887,789

(22) Filed: Feb. 2, 2018

(65) Prior Publication Data
US 2018/0216961 A1    Aug. 2, 2018

Related U.S. Application Data

(60) Provisional application No. 62/453,936, filed on Feb. 2, 2017.

(51) Int. Cl.
*G01D 4/00* (2006.01)
*G06Q 10/10* (2012.01)
(Continued)

(52) U.S. Cl.
CPC ............. *G01D 4/004* (2013.01); *G05B 15/02* (2013.01); *G05B 19/02* (2013.01); *G06F 1/189* (2013.01);
(Continued)

(58) Field of Classification Search
CPC ........ G01D 4/004; G05B 15/02; G05B 19/02; G05B 19/042; G05B 13/048;
(Continued)

(56) References Cited

U.S. PATENT DOCUMENTS 10,354,025 B1 *   7/2019   Hoff
2015/0233733 A1 *  8/2015   Parks, III ............... G06Q 10/10
                                                           340/870.02

(Continued)

*Primary Examiner* — Dionne Pendleton
(74) *Attorney, Agent, or Firm* — Greenberg Traurig, LLP

(57) ABSTRACT

Embodiments of the invention provide systems and method for monitoring unauthorized electrical grid access via an electrical connection to the electrical grid and/or an electrical component of the electrical grid, and retrieving customer energy data from an energy delivery server including one or more customer records of a customer's coupling to one or more energy delivery systems or networks. The system and method further includes deriving a information or rules from the customer energy data, and determining a net energy metering (NEM) status by establishing an indicator of net energy metering (NEM) access to the customer. The system and method further includes determining solar status by determining if the customer is a solar customer, analyzing and determining a system size of the customer, and determining unauthorized interconnection of the customer based on the analysis of system size, solar status, and the customer's net energy metering (NEM) status.

20 Claims, 4 Drawing Sheets

(51) Int. Cl.
    *G06Q 30/00* (2012.01)
    *G05B 19/02* (2006.01)
    *G05B 15/02* (2006.01)
    *G06F 1/18* (2006.01)
    *G06Q 50/06* (2012.01)
    *G06F 1/28* (2006.01)
    *H02J 13/00* (2006.01)
    *H02J 3/38* (2006.01)
    *G06F 21/30* (2013.01)

(52) U.S. Cl.
    CPC ............... *G06F 1/28* (2013.01); *G06Q 10/10* (2013.01); *G06Q 30/0185* (2013.01); *G06Q 50/06* (2013.01); *H02J 3/383* (2013.01); *H02J 13/002* (2013.01); *G06F 21/30* (2013.01)

(58) Field of Classification Search
    CPC ........ G05B 19/0426; G05B 2219/2642; G06F 1/189; G06F 1/28; G06F 21/30; G06F 17/5009; G06Q 50/06; G06Q 10/10; G06Q 30/0185; Y02B 70/346; Y02B 90/242; Y04S 20/322; Y04S 20/525; Y04S 10/123; Y04S 40/22; G06N 20/00; H02J 13/0006; H02J 13/0079; H02J 2003/003; H02J 2003/007; H02J 2003/143; H02J 2003/146; H02J 3/14; H02J 3/383; H02S 50/00; H04L 51/043; H04L 51/36; H04L 67/12; H04L 67/306; Y02E 10/563; Y02E 40/72; Y02E 60/76
    See application file for complete search history.

(56) References Cited

U.S. PATENT DOCUMENTS

2018/0131190 A1\* 5/2018 Murugesan ............. H02J 3/383
2019/0089194 A1\* 3/2019 Okita .................. H02J 13/0006

\* cited by examiner

UNAUTHORIZED ELECTRICAL GRID CONNECTION DETECTION AND CHARACTERIZATION SYSTEM AND METHOD

RELATED APPLICATIONS

This application claims priority to U.S. provisional application Ser. No. 62/453,936, filed on Feb. 2, 2017, the entire contents of which are incorporated herein by reference.

BACKGROUND

The accelerating growth of solar photovoltaic (PV) interconnections is expected to be an important component of an overall global strategy to reduce greenhouse gas emissions from the building sector. The penetration of rooftop solar has been growing quickly in many parts of the United States, most notably in California. For example, over 25% of the United States rooftop solar installations are in California, with some major utility companies servicing over 260,000 customers with rooftop solar, while connecting about 6,000 new customers per month. The penetration of solar is expected to continue growing due to various policy initiatives, decreasing solar costs, new leasing models or purchases without upfront costs, and natural turnover of housing stock (including remodeled and new housing).

The rapid growth of solar photovoltaic interconnections has posed challenges to the management of the distribution system. With rooftop solar becoming more prevalent, it is quickly becoming an important source of electric generation for many power distribution providers. As with any generation asset, the reliable prediction of generation profiles is essential for forecasting and planning purposes, particularly since typical rooftop solar cannot currently be dispatched. This need becomes even more pronounced at geographically granular levels, where distributed generation has significant implications for distribution systems in terms of operations and planning.

Further, there are also some implications for customers who use unauthorized solar photovoltaic systems, for those customers with authorized solar photovoltaic systems, and those without solar photovoltaic systems. For example, customers without permission to operate their solar photovoltaic systems are unable to sign up for advantageous net energy metering (hereinafter "NEM") rates. Moreover, customers considering installation of solar photovoltaic in the future may not fully factor into their investment decision future rate structures intended to guide value-based location of distributed solar photovoltaic. In the long run, solar customers with unauthorized connections may bypass distribution charges, unfairly placing those costs onto other customers. Distribution costs are not driven by the amount of kWh consumed, but by utilization of the distribution grid. The construct of recovering distribution costs based on energy consumption charges (kWh) is a holdover from a time when energy consumption could only be measured on a monthly basis. Over time, rates are expected to evolve to better align with the actual drivers of distribution system costs.

Without accurate solar photovoltaic location data, a utility is unable to accurately plan system upgrades based on the load and amount of distributed generation behind that equipment. As an example, engineering calculations determine when a secondary transformer or other equipment should be upgraded based on the amount of interconnected solar behind that equipment. Underestimation of the actual amount of solar due to unreported or inaccurately reported interconnections, can lead to voltage problems or other reliability issues. Customers who have not received interconnection authorization may have bypassed important building code requirements when installing their solar photovoltaic system.

A recent literature review of potential safety issues associated with unauthorized interconnections found that, while a small risk exists for utility workers who are servicing circuits with unidentified solar photovoltaic systems present as well as other risks, the most tangible risk from unauthorized interconnections are present on the customer side of the meter. Excessively high penetration rates of solar photovoltaic on feeders that are not rated for it may experience voltage fluctuations that could compromise service reliability.

A more up to date and accurate source of distributed solar photovoltaic system location data would better inform efforts to capture locational value of distributed solar photovoltaic and plan for hosting capacity while understanding system impacts and minimizing costs. Fortunately, because solar photovoltaic systems produce electricity and impact net household loads with reasonably regular patterns, meter load data (e.g., from so-called smart meters) is a readily available, rich source of information that can be used to improve upon current interconnection database information. By combining load data, weather patterns, customer locations, and interconnection data, it is possible to identify patterns which are consistent with interconnected solar photovoltaic systems. This pattern matching can be used to predict whether a particular location has an interconnected solar photovoltaic system. Locations which exhibit patterns consistent with solar photovoltaic systems but which do not appear in the interconnection database or mismatch between the size of solar photovoltaic reported in the interconnection database and the predicted size of the solar photovoltaic systems can be flagged.

SUMMARY

Some embodiments include a computer-implemented method of monitoring unauthorized electrical grid access comprising operating a hardware system with at least one processor executing instructions from a non-transitory computer-readable storage medium of an electrical grid access detection system. In some embodiments, the instructions cause the at least one processor to receive data from the electrical grid and retrieve customer energy data from at least one energy delivery server comprising customer records of a customer's coupling to one or more energy delivery systems or networks. In some embodiments, the instructions cause the processor to determine a net energy metering (NEM) status by establishing an indicator of net energy metering (NEM) access to the customer from the customer energy data. In some further embodiments, the instructions cause the processor to perform a process of determining solar status by determining if the customer is a solar customer from the customer energy data, and to analyze and determine system size of the customer from the customer energy data. In some other embodiments, the instructions cause the processor to prepare a determination of unauthorized interconnection of the customer based at least in part on the analysis of system size, solar status, and the customer's net energy metering (NEM) status.

Some embodiments include a computer-implemented method where the customer energy data comprises two months of interval data. Some further embodiments include a computer-implemented method where the customer energy data comprises a 15 minutes of maximum kWh within a two month period. Some embodiments include a computer-implemented method where the customer energy data comprises a total solar system size. Some embodiments include a computer-implemented method of determining from the energy data at least one of average kWh export average, average daily, daytime or nighttime export, average daily daytime exporting hour, exporting days, daytime versus nighttime variance, first export day, and median daytime export variance.

Some further embodiments include a computer-implemented method where a process of determining the net energy metering (NEM) status includes retrieving information on customer's with a NEM rate, retrieving a service point ID, creating a net energy metering (NEM) flag, and retrieving a list of net energy metering (NEM) aggregated of a premises. Some embodiments include a computer-implemented method where the process of determining solar status includes a process of excluding non-exporters of solar generated energy.

Some embodiments include a computer-implemented method where the process of determining solar status excludes net energy metering (NEM) aggregated customers. Some embodiments include a computer-implemented method where the process of determining solar status includes excluding customers with recently opened or recently closed service accounts. Some embodiments include a computer-implemented method where the process of determining solar status includes applying information or rules from energy data including at least one of average kWh export average, average daily, daytime or nighttime export, average daily daytime exporting hour, exporting days, daytime versus nighttime variance, first export day, and median daytime export variance. Some embodiments include a computer-implemented method where system size determination includes calculating a maximum export demand within a two month period, calculating a ratio between the maximum export demand and a recorded system size retrieved from the server for a net energy metering (NEM) customer, ranking the customer using the ratio and removing the top 1%, calculating a demand/adjusted factor input variable, and processing an estimate of system size for all customers identified to have solar. Some embodiments include a computer-implemented method where a process of determination of unauthorized interconnection of the customer includes pulling a record of list of customers identified to have solar but not net energy metering (NEM), and matching the record with estimated system size.

Some embodiments include a computer program product comprising one or more non-transitory computer-readable storage medium, storing instructions that, when executed, cause a processor to perform monitoring of unauthorized electrical grid access comprising the steps of coupling to at least a portion of an electrical grid and/or an electrical component of an electrical grid by establishing an electrical connection to at least a portion of the electrical grid and/or a component of the electrical grid. In some further embodiments, the steps include coupling to and retrieving customer energy data from at least one energy delivery server comprising customer records of a customer's coupling to one or more energy delivery systems or networks. In some other embodiments, the steps include determining a net energy metering (NEM) status by establishing an indicator of net energy metering (NEM) access to the customer from the customer energy data. In some further embodiments, the steps include performing a process of determining solar status by determining if the customer is a solar customer from the customer energy data. In some further embodiments, the steps include analyzing a system size of the customer from the customer energy data, and preparing a determination of unauthorized interconnection of the customer based at least in part on the analysis of system size, solar status, and the customer's net energy metering (NEM) status.

In some embodiments of the computer program product, the information calculated or derived from the energy data can comprise at least one of average kWh export average, average daily, daytime or nighttime export, average daily daytime exporting hour, exporting days, daytime versus nighttime variance, first export day, and median daytime export variance. In some embodiments of the computer program product, system size determination includes calculating a maximum export demand within a two month period, calculating a ratio between the maximum export demand and a recorded system size retrieved from the server for a net energy metering (NEM) customer, ranking the customer using the ratio and removing the top 1%, calculating a demand/adjusted factor input variable, and processing an estimate of system size for all customers identified to have solar.

Some embodiments include a hardware system for monitoring unauthorized electrical grid access comprising at least one processor executing instructions from a non-transitory computer-readable storage medium of an electrical grid fault detection system. In some embodiments, the instructions causes a processor to couple into at least a portion of an electrical grid by establishing an electrical connection to at least a portion of the electrical grid and/or a component of the electrical grid, and couple to and retrieve customer energy data from at least one energy delivery server comprising customer records of a customer's coupling to one or more energy delivery systems or networks. Further, in some embodiments, the instructions causes a processor to derive average kWh export average, average daily, daytime or nighttime export, average daily daytime exporting hour, exporting days, daytime versus nighttime variance, first export day, and median daytime export variance from the customer energy data, and determine a net energy metering (NEM) status by establishing an indicator of net energy metering (NEM) access to the customer from the customer energy data. In some embodiments, the instructions causes a processor to perform a process of determining solar status by determining if the customer is a solar customer from the customer energy data. In some embodiments, the instructions causes a processor to analyze a system size of the customer from the customer energy data, and prepare a determination of unauthorized interconnection of the customer based at least in part on the analysis of system size, solar status, and the customer's net energy metering (NEM) status.

In some embodiments of the hardware system, the information derived from the customer energy data can comprised at least one of average kWh export average, average daily, daytime or nighttime export, average daily daytime exporting hour, exporting days, daytime versus nighttime variance, first export day, and median daytime export variance. In some embodiments of the hardware system, the process of determining the net energy metering (NEM) status includes retrieving information on customer's with a NEM rate, retrieving a service point ID, creating a net energy metering (NEM) flag, and retrieving a list of net energy metering (NEM) aggregated of a premises.

In some further embodiments of the hardware system, the process of determination of unauthorized interconnection of the customer includes pulling a record of list of customers identified to have solar but not net energy metering (NEM), and matching the record with estimated system size. In some embodiments of the hardware system, the system size determination includes calculating a maximum export demand within a two month period, calculating a ratio between the maximum export demand and a recorded system size retrieved from the server for a net energy metering (NEM) customer, ranking the NEM customer using the ratio and removing the top 1%, calculating a demand/adjusted factor input variable, and processing an estimate of system size for all customers identified to have solar.

DETAILED DESCRIPTION

Figure 1:
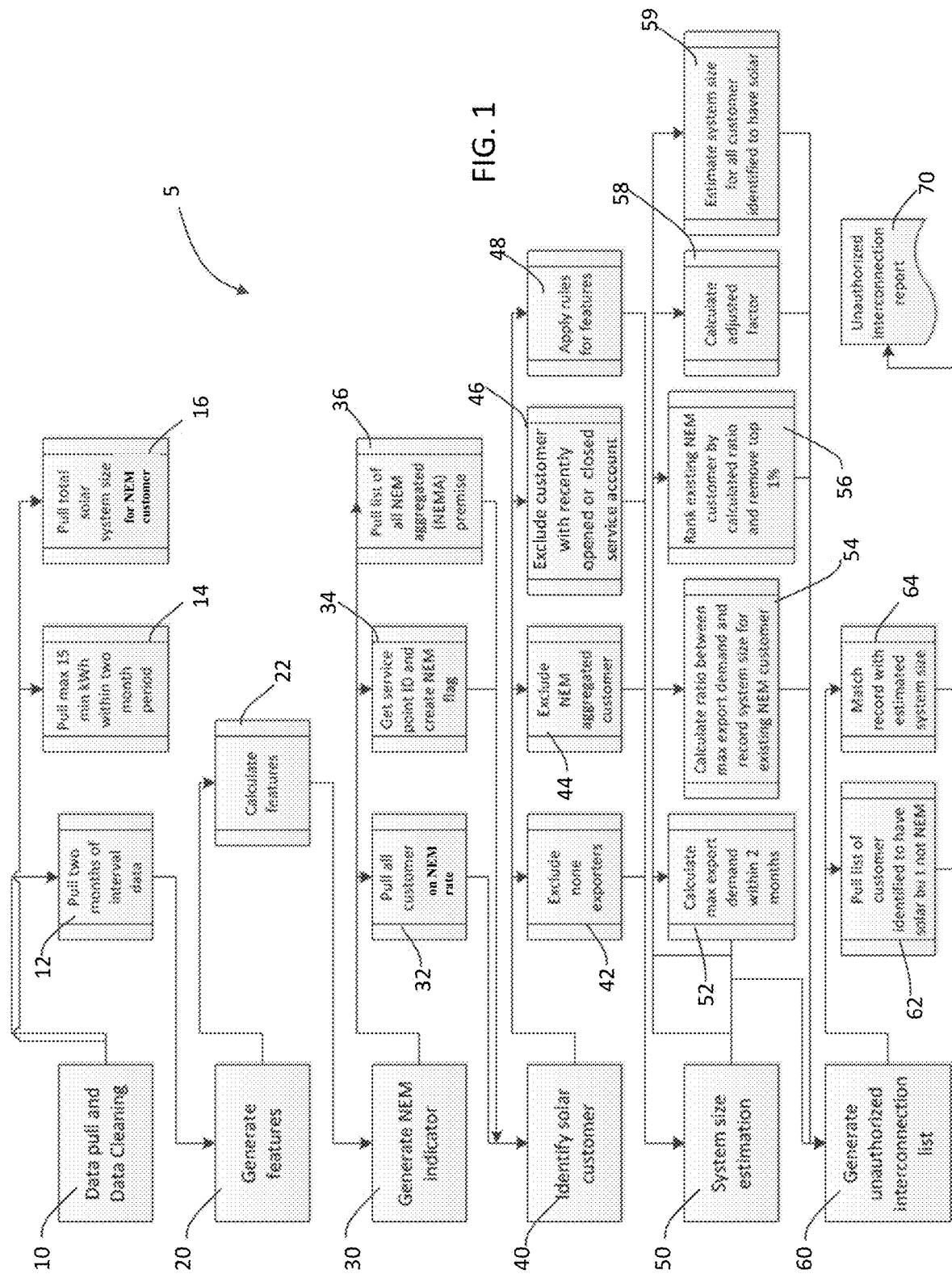
FIG. 1 illustrates a process flow of an unauthorized electrical grid connection system and method in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments of the invention include methods to identify and/or track one or more illicit or unauthorized coupling to one or more energy delivery systems or networks. Some embodiments include methods for identifying unconnected solar customers. Some embodiments include methods for identifying the customers most likely to have one or more rooftop solar installations based on one or more observable characteristics such as rate, low income status (rate), location, usage, and other conventional factors. For example, FIG. 1 illustrates a process flow 5 of an unauthorized access detection system and method in accordance with some embodiments of the invention. As shown, in some embodiments, the process flow 5 can include six primary processes (10, 20, 30, 40, 50, 60) each including to or including one or more sub-processes, which at least in part, can identify and/or track one or more illicit or unauthorized coupling to one or more energy delivery systems or networks. For example, some embodiments, the unauthorized electrical grid connection system and method can include "Data pull and data cleaning" process 10, and/or "generate features" process 20, and/or "generate NEM indicator" process 30, and/or "identify solar customer" process 40, and/or "system size estimation" process 50, and/or "generate unauthorized interconnection list" 60.

In some embodiments, energy consumption from specific time periods energy maximums and/or minimums can be retrieved. In some further embodiments, information on a total size of a solar system of a NEM customer can be retrieved. For example, in some embodiments of the invention, the process 10 can include one or more processes that include measuring and/or retrieving electrical data for a customer. For example, in some embodiments of the invention, the process 10 can include "pull two months of interval data" process 12, and/or "pull maximum 15 minimum kWh within two month period" process 14, and/or "pull total solar system size for NEM customer" process 16.

In some further embodiments, the "generate features" process 20 can comprise "calculate features" process 22. In some embodiments, features can include, but not be limited to, average kWh export average, average daily, daytime or nighttime export, average daily daytime exporting hour, exporting days, daytime versus nighttime variance, first export day, and/or median daytime export variance.

Some embodiments include processes for generating a NEM indicator. For example, in some other embodiments, the "generate NEM indicator" process 30 can comprises "pull all new customer on new rate" process 32, and/or "get service point ID and create NEM flag" process 34, and/or "pull list of all NEM aggregated ("NEMA") premise" process 36.

In some embodiments, the NEM indicator information generated in process 30 can be processed to determine a solar customer. For example, some embodiments of the invention include an "identify solar customer" process 40. In some embodiments, the process 40 can exclude non-exporters, exclude NEM aggregated customers, and exclude customers with recently opened or closed accounts. For example, in some embodiments, process 40 can include "identify solar customer" process 40 can comprise "exclude none exporters" process 42, and/or "exclude NEM aggregated customer" process 44, and/or "exclude customer with recently opened or closed service account" process 46, and/or "apply rules for features" process 48.

Some further embodiments include an estimation of system size. For example, some embodiments include the "system size estimation" process 50 that can include "calculate maximum export demand within two months" process 52, and/or "calculate ratio between maximum export demand and record system size for existing NEM customer" process 54, and/or "rank existing NEM customer by calculated ratio and remove top 1%" process 56, and/or "calculate adjusted factor" process 58, and/or "estimate system size for all customer identified to have solar" process 59.

In some embodiments, using the data calculated from processes 10, 20, 30, 40, 50, an unauthorized interconnection list can be generated. For example, in some embodiments of the invention, the "generate unauthorized interconnection list" process 60 can comprise "pull list of customer identified to have solar but not NEM" process 62, and/or "match record with estimated system size" process 64. In some embodiments, the final output from process 60 can comprise an "unauthorized interconnection report" 70. In some embodiments, the executed order of the processes 10, 20, 30, 40, 50, 60 can be modified and/or one or more of the processes 10, 20, 30, 40, 50, 60 can be excluded.

Figure 2:
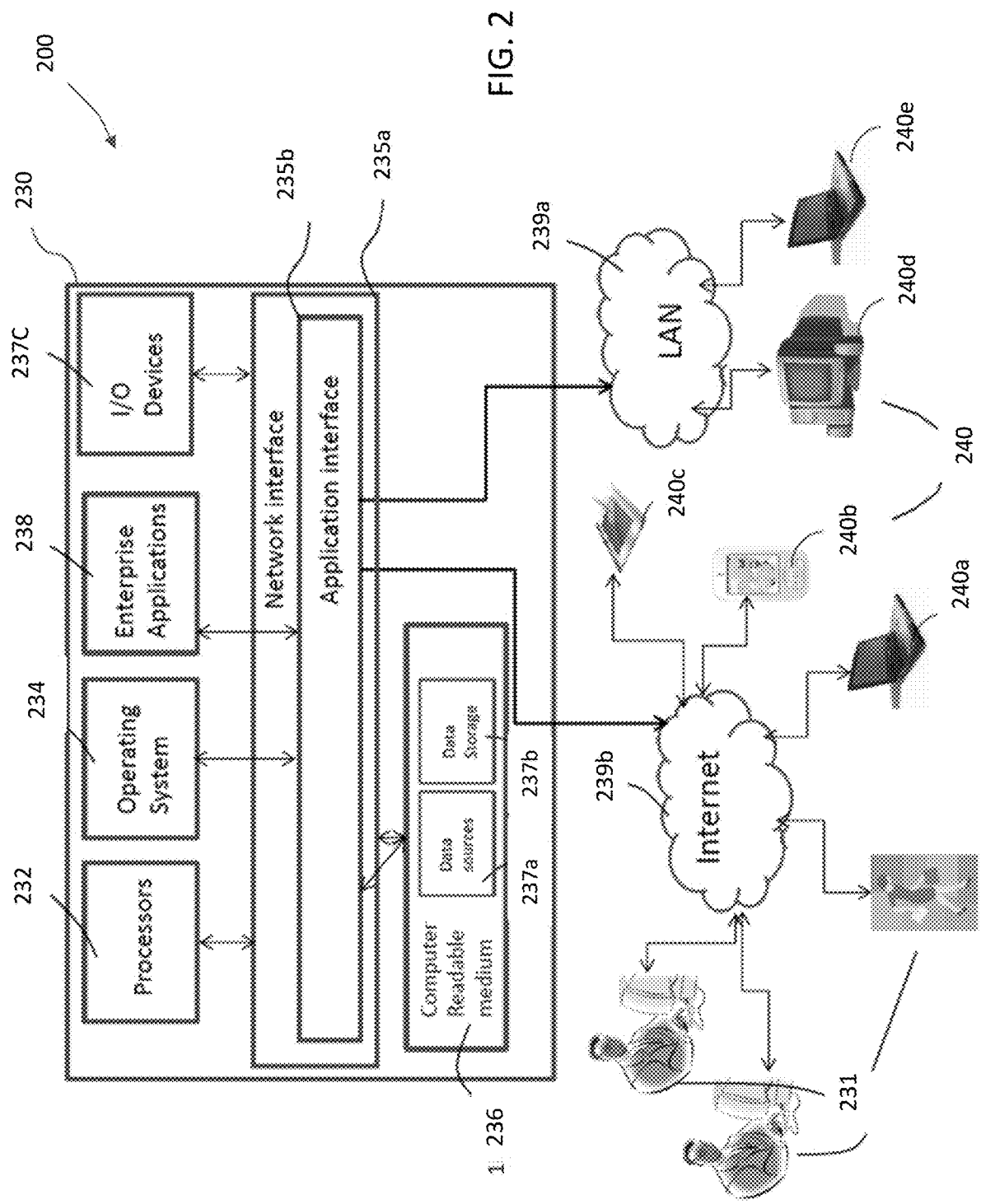
FIG. 2 illustrates a system for operating a unauthorized access detection system and method in accordance with some embodiments of the invention.

Some embodiments include meters, systems, or assemblies of an unauthorized access detection system and method described herein can use at least one computing system within a networked metering or power network. For example, FIG. 2 shows an architecture diagram 200 of a system for operating an unauthorized access detection system according to one embodiment of the invention. The diagram 200 shows one example embodiments of a system 230 for performing one or more of the methods of the unauthorized access detection system that, as one non-limited example, can operate, read, send data and/or read data from one or more meters (e.g., such as smart meters described earlier). As shown, the system 230 can include at least one computing device, including one or more processors. Some processors can include processors 232 residing in one or more conventional server platforms. In some embodiments, the system 230 can include a network interface 235a and/or an application interface 235b coupled to at least one processor 232 capable of running at least one operating system 234, and one or more of the software modules 238 (e.g., such as enterprise applications). In some embodiments, the software modules 238 can include server-based software platform that can include unauthorized access detection system and method software modules suitable for hosting at least one user account and at least one client account, as well as transferring data between one or more accounts.

In some embodiments of the invention, any one or more of the steps 10, 20, 30, 40, 50, 60 and/or sub-steps can receive one or more data inputs from a variety of data sources. In some embodiments, the data sources can comprise one or more main classes of data including, but not limited to, customer interval data, and/or solar interconnection data, and/or data correlated with local solar production. In some embodiments of the invention, residential customer interval data can comprise hourly energy usage data (herein defined as "channel 1" data), and/or excess energy generation data that is exported back to a utility or energy provider (herein defined as "channel 2" data). In some embodiments, the data or data source can comprise solar interconnection data in a utility and/or energy provider interconnection database comprising submitted applications which have been approved or applications still under review. In other embodiments of the invention, the data can include customer demographic and account information which indicates NEM status.

Some embodiments include source data that can include variables correlated with local solar production including, but not limited to, local sunset and sunrise times, temperature, humidity, and/or cloud cover, etc. In some embodiments, sunrise and sunset times can be obtained from the National Oceanic and Atmospheric Administration (NOAA) website. Some embodiments include solar production correlated data accumulated from multiple sources, and in some embodiments, focus on weather variables with which solar production would be most directly correlated. In some embodiments, the data can include temperature, relative humidity, cloud cover, and dew point temperature data from local weather stations. In some embodiments, data from one or more of the aforementioned classes of data can be combined to produce an analysis dataset including customer load data, weather data, and known assignment of solar photovoltaic and non-solar photovoltaic ownership (based on data from an interconnection database and known NEM status).

In some embodiments, the customers in this dataset can be randomly sampled to provide a representative subset of residential customers. In some embodiments, data from data sources can include hourly measures of voltage, except for the minority of customers with meters with sub-hour intervals (e.g., such as on 15-minute intervals). In some embodiments, the data in this dataset can be instantaneous voltage measurements taken at the beginning of each interval. In some embodiments, the voltage measured at the customer meter must be between 228V and 252V for customers with 240V service, and between 114V and 126V for customers with 120V service. In some embodiments, the voltage data can be combined with previously provided demographic, weather, and irradiance data, as well as publicly available sunrise/sunset data.

Referring again to FIG. 1, in some embodiments of the invention, processing of any of the steps 10, 20, 30, 40, 50, 60 and/or selection or use of any of the data from any source can be governed by one or more rules as shown. In some embodiments, the "pull two months of interval data" process 12 can process one or more inputs comprising start date and/or an end date, and/or service point identification (hereinafter "service point ID"), and/or usage date, and/or interval hour, and/or kWh export. In some further embodiments, the "pull maximum 15 minimum kWh within two month period" process 14 can process inputs comprising kWh interval. In some embodiments, the "pull total solar system size for new customer" process 16 can process one or more inputs comprising total size (i.e., the total system size of the premises), and/or the service point ID. In some further embodiments, the "calculate features" process 22 can process one or more inputs comprising the sunrise time and/or the sunset time, and/or the usage date, hour, and/or the hourly kWh export. In some further embodiments, the "pull all new customer on new rate" process 32 can process one or more inputs comprising service agreement ID, and/or service point ID, and service agreement start date and end date, and or service agreement cancel indicator.

In some embodiments of the invention, the "get service point ID and create NEM flag" process 34 can process one or more inputs comprising a service point ID, and/or a net meter indicator, and/or a NEM type code. In some other embodiments, the "pull list of all NEM aggregated (NEMA) premise" process 36 can process one or more inputs comprising NEM type code, and/or a premises ID, and/or a service point ID. In some embodiments, the "exclude none exporters" process 42 can process inputs comprising a total number of exporting days. In some further embodiments, the "exclude customer with recently opened or closed service account" process 46 can process one or more inputs comprising a service agreement, and/or a service point ID, and/or a service agreement start date and end date.

In some further embodiments of the invention, the "apply rules for features" process 48 can process one or more inputs comprising features, and/or a NEMA indicator, and/or NEM indicator. In some embodiments, the "calculate maximum export demand within two months" process 52 can process an input comprising a maximum 15 minimum kWh. In some further embodiments, the "calculate ratio between maximum export demand and record system size for existing NEM customer" process 54 can process one or more inputs comprising demand, and/or aggregated total size. In some embodiments of the invention, the "rank existing NEM customer by calculated ratio and remove top 1%" process 56 and "calculate adjusted factor" process 58 can process an input comprising a ratio of ranked NEM customer. Some embodiments include an "estimate system size for all customer identified to have solar" process 59 that can process one or more inputs comprising an adjusted factor, and/or demand. In some further embodiments, the "pull list of customer identified to have solar but not NEM" process 62 can process an input comprising a list of service points identified to have solar. In other embodiments, the "match record with estimated system size" process 64 can process one or more inputs comprising a predicted system size. In some other embodiments of the invention, the "pull two months of interval data" process 12 can include rules, including, but not limited to, set start date and end date to a 2 month period, and/or pull kWh data only, limit the data to reverse flow (export) only, and/or use channel 2 (export) data from an NEM customer (e.g., for model training purposes) and data from non-NEM customers.

In some further embodiments, the "pull maximum 15 minimum kWh within two month period" process 14 can include rules, including, but not limited to, pull maximum kWh within a 15 minimum interval. In some embodiments, the "pull total solar system size for new customer" process 16 can include rules, including, but not limited to, sum the total system size of premises. In some embodiments, the "calculate features" process 22 can include rules, including, but not limited to, get sunrise and sunset hours for the defined 2 month period, and/or average kWh export for each hour of the day. Further, in some embodiments, the rules can include sum of total export kWh/sum of total number of days with export, and/or sum of total export kWh during daytime/sum of total number of days with daytime export. Further, in some embodiments, the rules can include sum of total export kWh during nighttime/sum of total number of days with nighttime export, and/or sum of total number of export hour/sum of number of days with export. Further, in some embodiments, the rules can include sum of total number of export hour during daytime/sum of number of days with daytime export, and/or sum of number of exporting days. In some embodiments, the rules can include average kWh export difference between daytime and nighttime/average kWh daytime export, and/or the ith day with first export during this 2 month period, and/or the median of daily non-zero export kWh differences.

In some embodiments, the "pull all new customer on new rate" process 32 can include rules, including, but not limited to, service point has at least one active service agreement now, and/or exclude service agreement that is canceled, and/or get only the active service agreement. In some further embodiments, the "get service point ID and create NEM flag" process 34 can include rules, including, but not limited to, create a flag for all NEM rate service points. In some other embodiments, the "pull list of all NEM aggregated (NEMA) premise" process 36 can include rules, including, but not limited to, if one of the service points is in NEMA related rates, all service points within that premises is authorized and flag with NEMA indicator.

In some embodiments, the "exclude none exporters" process 42 can include rules, including, but not limited to, total number of exporting day is greater than or less than zero. In some further embodiments, the "exclude NEM aggregated customer" process 44 can include rules, including, but not limited to, remove a service point on the NEMA list. In some embodiments of the invention, the "exclude customer with recently opened or closed service account" process 46 can include rules, including, but not limited to, exclude service agreement with its service account open or closed within plus or minus three days of the run day.

In some embodiments, the "apply rules for features" process 48 can include rules, including, but not limited to, average daily kWh export is greater than zero, and/or the variance of daytime nighttime export is greater than or equal to 0.9, and/or the average daytime exporting hours is greater than one. Further, in some embodiments, the rules can include the total number of exporting days is greater than one, and/or the median daytime export variance is 0.0, and/or export 80% of the days, and/or the first exporting day is one. Further, in some embodiments, the rules can include the premises ID not on the NEMA list, and/or the average daily kWh export is greater than 0.2, and/or the customer is a residential customer.

In some embodiments of the invention, the "calculate maximum export demand within two months" process 52, can include rules, including, but not limited to, convert maximum 15 minimum interval usage into demand. In some further embodiments, the "calculate ratio between maximum export demand and record system size for existing NEM customer" process 54 can include rules, including, but not limited to, calculate demand/solar system size on record for all NEM service points. In some embodiments, the "rank existing NEM customer by calculated ratio and remove top 1%" process 56, can include rules, including, but not limited to, rank ratio from large to small and exclude the top 1%. In some embodiments, the "calculate adjusted factor" process 58 can include rules, including, but not limited to, sum of demand/sum of recorded system size. In some embodiments, the "estimate system size for all customer identified to have solar" process 59 can include rules based on the demand/adjusted factor input variable.

In some embodiments, for step 10, the aforementioned outputs can comprise the service point ID, and/or the usage date, and/or the interval hour, and/or the hourly export, and/or the maximum 15 minimum kWh, and/or the aggregated total size, and/or the service point ID. In some embodiments, for step 20, the outputs can comprise average hourly kWh export, and/or average daily kWh export, and/or average daytime kWh export, and/or average nighttime kWh export, and/or average daily exporting hours, and/or average daytime exporting hours, and/or total number of exporting days, and/or variance of daytime nighttime export, and/or first exporting day, and/or median daytime export variance.

In some embodiments, for step 30, the outputs can comprise service agreement ID, and/or service point ID, and/or service agreement start date and end date, and/or service point ID, and/or NEM indicator, and/or NEMA indicator. In some embodiments, for step 40, the outputs can comprise a list fulfill left features which is identified as having solar. In some further embodiments, for step 50, the outputs can comprise demand, the calculated ratios, adjusted factor, and/or predicted system size. In some embodiments, for step 60, the outputs can comprise at least one unauthorized interconnection report.

With the above embodiments in mind, it should be understood that the invention can employ various computer-implemented operations involving unauthorized access detection system and method data stored in computer systems. Further, referring back to system 230 of FIG. 2, some embodiments of the invention relate to or include a device or an apparatus for performing these operations of the operating system 234 and/or the software modules 238. In some embodiments, the apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general purpose computer selectively activated or configured by one or more computer programs stored in the computer memory, cache, or obtained over a network. When data are obtained over a network the data can be processed by other computers on the network, e.g. a cloud of computing resources. Moreover, the above-described databases and models throughout the unauthorized access detection system and method can store analytical models and other data on computer-readable storage media within the system 230 and on computer-readable storage media coupled to the system 230. In addition, the above-described applications of the unauthorized access detection system and method system can be stored on computer-readable storage media within the system 230 and on computer-readable storage media coupled to the system 230. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated.

Some embodiments include the system 230 comprising at least one computer readable medium 236 coupled to at least one data storage device 237*b*, and/or at least one data source 237*a*, and/or at least one input/output device 237*c*. In some embodiments, the invention embodied by the unauthorized access detection system and method can be embodied as computer readable code on a computer readable medium 236. In some embodiments, the computer readable medium 236 can be any data storage device that can store data, that can thereafter be read by a computer system (such as the system 230). Examples of the computer readable medium 236 can include hard drives, network attached storage (NAS), read-only memory, random-access memory, FLASH based memory, CD-ROMs, CD-Rs, CD-RWs, DVDs, magnetic tapes, other optical and non-optical data storage devices, or any other physical or material medium which can be used to tangibly store the desired information or data or instructions and which can be accessed by a computer or processor (including processors 232).

In some embodiments of the invention, the computer readable medium 236 can also be distributed over a conventional computer network via the network interface 235*a* so that the unauthorized access detection system and method embodied by the computer readable code can be stored and executed in a distributed fashion. For example, in some embodiments, one or more components of the system 230 can be tethered to send and/or receive data through a local area network ("LAN") 239*a*. In some further embodiments, one or more components of the system 230 can be tethered to send or receive data through an internet 239*b* (e.g., a wireless internet). In some embodiments, at least one software application 238 running on one or more processors 232 can be configured to be coupled for communication over a network 239*a*, 239*b*. In some embodiments, one or more components of the network 239*a*, 239*b* can include one or more resources for data storage, including any other form of computer readable media beyond the media 236 for storing information and including any form of computer readable media for communicating information from one electronic device to another electronic device.

In some embodiments of the invention, the network 239*a*, 239*b* can include wide area networks ("WAN"), direct connections (e.g., through a universal serial bus port) or other forms of computer-readable media 236, or any combination thereof. Further, in some embodiments, one or more components of the network 239*a*, 239*b* can include a number of client devices which can be personal computers 240 including for example desktop computers 240*d*, laptop computers 240*a*, 240*e*, digital assistants and/or personal digital assistants (shown as 240*c*), cellular phones or mobile phones or smart phones (shown as 240*b*), pagers, digital tablets, internet appliances, and other processor-based devices. In general, a client device can be any type of external or internal devices such as a mouse, a CD-ROM, DVD, a keyboard, a display, or other input or output devices 237*c*. In some embodiments, various other forms of computer-readable media 236 can transmit or carry instructions to a computer 240, including a router, private or public network, or other transmission device or channel, both wired and wireless. The software modules 238 can be configured to send and receive data from a database (e.g., from a computer readable medium 236 including data sources 237*a* and data storage 237*b* that can comprise a database), and data can be received by the software modules 238 from at least one other source. In some embodiments, at least one of the software modules 238 can be configured within the system to output data to a user 231 via at least one smart meter (e.g., such as to a computer 240 comprising a smart meter).

In some embodiments, the system 230 as described above can enable one or more users 231 to receive, analyze, input, modify, create and send data to and from the system 230, including to and from one or more enterprise applications 238 running on the system 230. Some embodiments include at least one user 231 coupled to a computer 240 accessing one or more modules of the unauthorized access detection system and method including at least one enterprise applications 238 via a stationary I/O device 237*c* through a LAN 239*a*. In some other embodiments, the system 230 can enable at least one user 231 (through computer 240) accessing enterprise applications 238 via a stationary or mobile I/O device 237*c* through an internet 239*a*.

Figure 3:
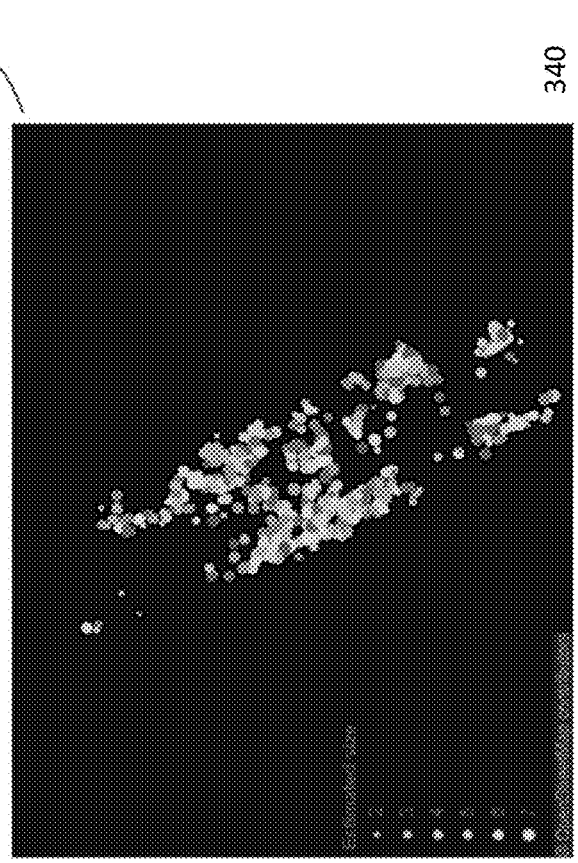
FIGS. 3-4 illustrate an unauthorized interconnection dashboard in accordance with some embodiments of the invention.
Figure 3:
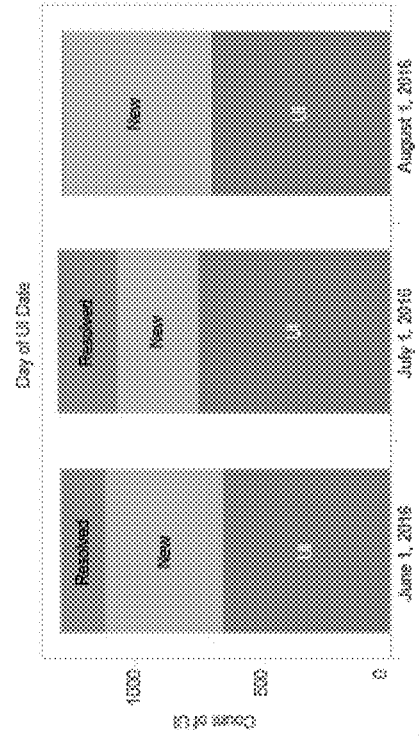
Figure 4:
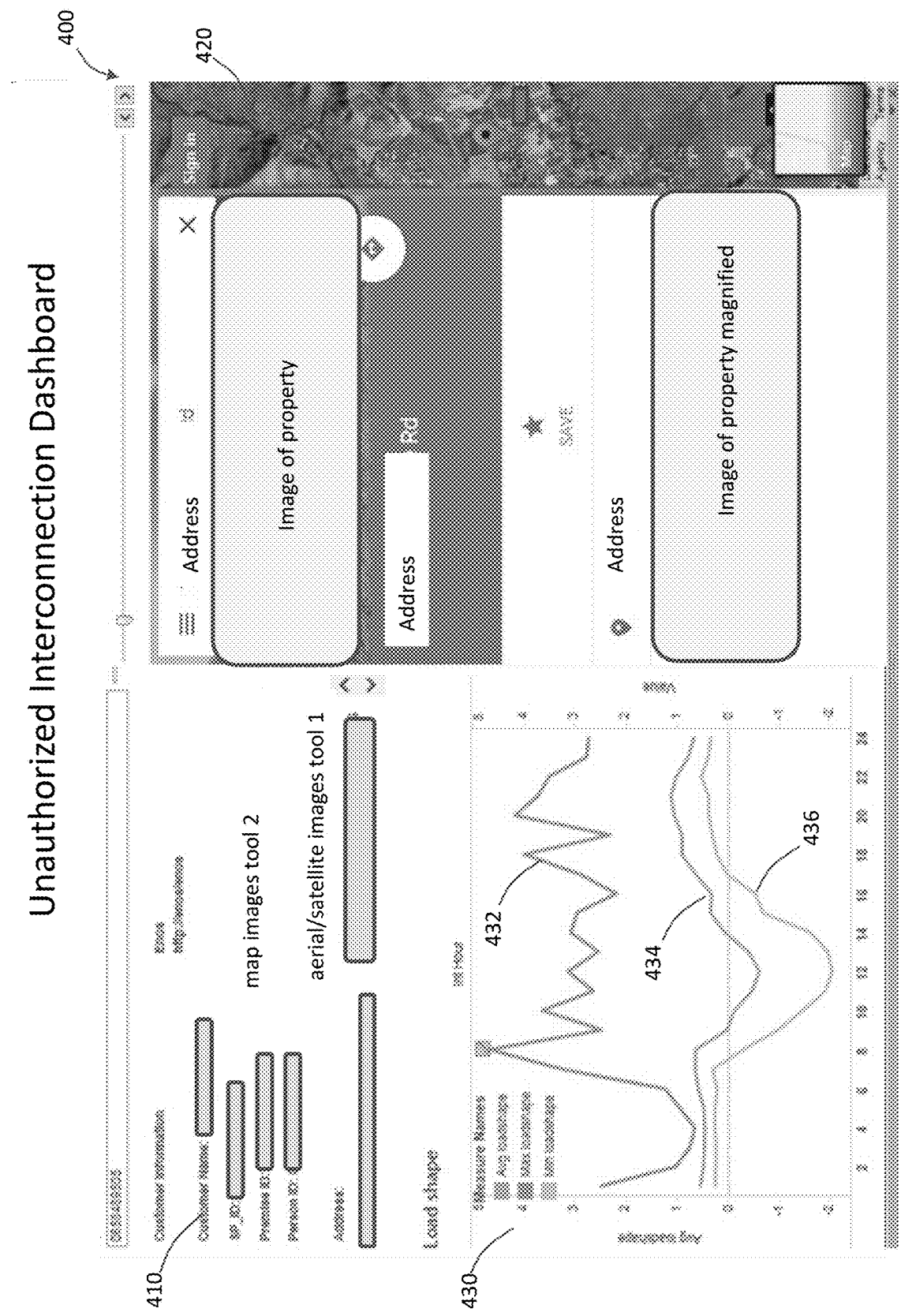

In some embodiments, the system 230 can process a dashboard that can be used to track the incidence and geographical clustering of unauthorized interconnection to monitor and track new unauthorized interconnections, and the resolve existing or known unauthorized interconnections. In some embodiments, utility companies can leverage the dashboard to monitor the progress of unauthorized interconnection detection, prioritization and resolution. In some embodiments, in order to track the incidence and geographical clustering of unauthorized interconnections, a dashboard can be used to concisely represent the information on unauthorized interconnections and key performance indicators (KPIs). For example, FIGS. 3-4 illustrate unauthorized interconnection dashboards 300, 400 in accordance with some embodiments of the invention. In reference to FIG. 3, in some embodiments, interconnection dashboards 300 can include an interactive map 320 that identifies the unauthorized interconnections geo-located on a map of service territory. Additionally, some further embodiments include an unauthorized interconnection status tracker by month (shown as plots 310 and 330) that can be configured to display existing unauthorized interconnections, and/or new unauthorized interconnections detected that have yet to be resolved (plot 332), and/or resolved unauthorized interconnections (plot 334). Finally, there can also be a section 340 that prioritizes the feeders (e.g., a top five) with unauthorized interconnections by estimate system size to aid in the users' ability to prioritize customers based on the feeder limits (kW) identified.

In some embodiments of the invention, a dashboard can be used to display information about one or more specific properties with unauthorized interconnections. For example, the non-limiting embodiment of FIG. 4 shows dashboard 400 including customer information 410, load shape plot 430, and a display 420 including map, location, and/or property views. In some embodiments, the load shape plot 430 can include maximum and minimum load shape plots (432, 436), and an average load shape plot (434).

In some embodiments of the invention, any unauthorized interconnections list prepared by any of the systems of methods described herein can be updated based on customer feedback and/or field personnel observations. In some embodiments, the unauthorized interconnections list can be updated based on one or more unauthorized interconnection exceptions. In some embodiments, any updates to the unauthorized interconnections list reflected in information displayed by a dashboard (e.g., such as dashboards 300, 400). In some embodiments, the updates to the dashboards 300, 400 can be made in real time or near real time.

Some embodiments include probabilistic systems and method capable of predicting or determining whether or not a residential customer has a solar photovoltaic system at their premises, and the size of the solar photovoltaic system. In some embodiments, source data can comprise received energy and channel 2 reverse flow hourly interval usage data, along with data correlated with solar photovoltaic production including various weather variables. In some embodiments, pulled data can contain date/time stamp and customer identifier for each interval reading. Further, some embodiments include systems and methods to predict the presence of solar across a representative sample of energy provider residential customers. Some further embodiments include systems and methods to predict the presence of solar across a representative sample of energy provider residential customer constrained to those residing single family homes. Some other embodiments include systems and methods to predict prediction of the size of known solar photovoltaic systems.

Some embodiments include the systems and methods for identification of underperformance. In some embodiments, systems and methods described herein can accurately identify underperforming solar photovoltaic systems regardless of their proportion of the overall solar population. In some embodiments, systems and methods described herein can find underperforming solar photovoltaic systems when there is at least one week of post-failure data available. In some embodiments, if a solar photovoltaic underperformance detection system is operationalized, the energy provider can use the model specification that was produced by the analysis dataset with 1 week of post-failure data.

In some embodiments, the data inputs to the unauthorized access detection system and method described herein can include load predictors. For example, Table 1 includes load predictors according to some embodiments of the invention.

TABLE 1

Load predictors according to some embodiments of the invention.

| | Name | Channel | Hypothesis | Construction |
|---|---|---|---|---|
| 1 | Average daytime kW | Whole building; channel 2 | Solar photovoltaic interconnected customers have lower demand on average | Use sunrise/sunset data to restrict to daylight hours. Take average of kW over these hours in each day, and then take average over days. This is performed separately for whole building (channel 1 reading-channel 2 reading) and for channel 2 only. |
| 2 | Average minimum daytime kW | Whole building | Solar photovoltaic interconnected customers have consistent trough of low demand | Use sunrise/sunset data to restrict to daylight hours. Take minimum of kW over these hours in each day, and then take average of that minimum over days. This is performed for whole building (channel 1 reading-channel 2 reading) only. |
| 3 | Average maximum daytime kW | Channel 2 | Solar photovoltaic interconnected customers will have output on channel 2 | Use sunrise/sunset data to restrict to daylight hours. Take maximum of kW over these hours in each day, and then take average of that maximum over days. This is performed for channel 2 only. |
| 4 | Minimum daytime kW | Whole building | Solar photovoltaic interconnected customers will have a low minimum demand if solar generation is peaking and no other load is present | Use sunrise/sunset data to restrict to daylight hours. Take minimum of kW over these hours for whole time period. This is performed for whole building (channel 1 reading-channel 2 reading) only. |
| 5 | Maximum daytime kW | Whole building; channel 2 | Solar photovoltaic interconnected customers will have a low maximum demand in whole building data and a high maximum output in | Use sunrise/sunset data to restrict to daylight hours. Take maximum of kW over these hours for whole time period. This is performed for whole building (channel 1 reading-channel |

TABLE 1-continued

Load predictors according to some embodiments of the invention.

| | Name | Channel | Hypothesis | Construction |
|---|---|---|---|---|
| | | | channel 2 | 2 reading), as well as for channel 2 only. |
| 6 | Standard deviation of average daytime kW | Whole building; channel 2 | Most people's usage will be pretty constant from day to day but solar photovoltaic connections may increase variation from one day to the next due to variation in weather affecting solar generation. | Restrict to daylight hours, average value for each day. Then take standard deviation of average demand in those hours over all days. This is performed separately for whole building (channel 1 reading-channel 2 reading) and for channel 2 only. |
| 7 | N Hours of negative whole building daytime kW | Whole building | Solar photovoltaic interconnected customers have reverse flow if the system is oversized | Use interval data to count # hours with negative values. |
| 8 | N Hours of negative channel 2 daytime kW | Channel 2 | Solar photovoltaic interconnected customers have reverse flow if the system is oversized | Use interval data to count # hours with positive values in channel 2. |
| 9 | Total daytime consumption | Whole building; channel 2 | Total whole building consumption may be lower for solar customers, total channel 2 output may be higher | Sum output for whole building and channel 2 separately over every hour in time period. |

In some embodiments, a load predictor can comprise an average daytime kW from a whole building using channel 2 data, and can be based on solar photovoltaic interconnected customers having lower demand on average. In some embodiments, the unauthorized access detection system and method can use sunrise/sunset data to restrict to daylight hours, and can take an average of kW over these hours in each day, and then take average over days. In some embodiments, this can be performed separately for whole building (channel 1 reading-channel 2 reading) and for channel 2 data only.

In some further embodiments, a load predictor can comprise an average minimum daytime kW from a whole building, and can be based on solar photovoltaic interconnected customers that have consistent trough of low demand. In some embodiments, the unauthorized access detection system and method can use sunrise/sunset data to restrict to daylight hours. In some embodiments, the unauthorized access detection system and method can take a minimum of kW over these hours in each day, and then take an average of that minimum over days. In some embodiments, this can be performed for a whole building (channel 1 reading-channel 2 reading) only.

In some other embodiments, a load predictor can comprise an average minimum daytime kW from a whole building, and can be based on solar photovoltaic interconnected customers will have output on channel 2. In some embodiments, the unauthorized access detection system and method can use sunrise/sunset data to restrict to daylight hours, take the maximum of kW over these hours in each day, and then take an average of that maximum over days. In some embodiments, this is performed for channel 2 data only.

In some further embodiments, a load predictor can comprise a minimum daytime kW data from a whole building, and can be based on solar photovoltaic interconnected customers having a low minimum demand if solar generation is peaking and no other load is present. In some embodiments, the unauthorized access detection system and method can use sunrise/sunset data to restrict to daylight hours, and take a minimum of kW over these hours for whole time period. In some embodiments, this can be performed for whole building (channel 1 reading-channel 2 reading) only.

In some further embodiments, a load predictor can comprise a minimum daytime kW data from a whole building, and can be based on maximum daytime kW from a whole building and making use of channel 2. This can be based on solar photovoltaic interconnected customers will having a low maximum demand in whole building data and a high maximum output in channel 2. In some embodiments, the unauthorized access detection system and method can use sunrise/sunset data to restrict to daylight hours. In some embodiments, the unauthorized access detection system and method can take a maximum of kW over these hours for a specified time period. In some embodiments, this can be performed for a whole building (channel 1 reading-channel 2 reading), as well as for channel 2 data only.

In some further embodiments, a load predictor can comprise a standard deviation of average daytime kW for a whole building with channel 2 data, and can be based on usage that can be generally constant from day to day, but where solar photovoltaic connections may increase variation from one day to the next due to variation in weather affecting solar generation. In some embodiments, the unauthorized access detection system and method can restrict to daylight hours, and an average value for each day, with a standard deviation of average demand in those hours over all days. In some embodiments, this can be performed separately for whole building (channel 1 reading-channel 2 reading) and for channel 2 only.

In some further embodiments, a load predictor can comprise a specific number ("n") hours of negative whole building daytime kW for a whole building, where the solar photovoltaic interconnected customers have reverse flow if the system is oversized. In this instance, the unauthorized access detection system and method can use interval data to count the number of hours with negative values. In some other embodiments, the unauthorized access detection system and method can include a load predictor can comprise a specific number ("n") hours of negative channel 2 daytime kW from a whole building, where the solar photovoltaic interconnected customers have reverse flow if the system is oversized. In this instance, the unauthorized access detection system and method can use interval data to count the number of hours with positive values in channel 2.

In some further embodiments, the load predictor can comprise total daytime consumption from a whole building with channel 2 data, where for a total whole building, the consumption may be lower for solar customers, but total channel 2 output may be higher. In this instance, the unauthorized access detection system and method can sum output for whole building and channel 2 separately over every hour in time period.

In some embodiments, the data inputs to the unauthorized access detection system and method described herein can include load predictors illustrated in Table 2.

In some further embodiments, the load predictors can comprise a percent change in kW at sunrise for a whole building, where the rate of change of usage reflects the starting of solar photovoltaic system generation. In this instance, the unauthorized access detection system and method can use sunrise/sunset data to select hour of sunrise, average kW in the two hours that precedes that hour and the two hours succeeding that hour, and calculate the percent change.

In some further embodiments, the load predictors can comprise a percent change in kW sunset for a whole building, where the rate of change of usage reflects reduction or stopping of solar photovoltaic system generation. In this instance, the unauthorized access detection system and

TABLE 2

Load predictors according to some embodiments.

| | Name | Channel | Hypothesis | Construction |
|---|---|---|---|---|
| 10 | Ratio of average daytime kW to nighttime kW | whole building | Solar photovoltaic interconnected customers have lower daytime usage on average relative to nighttime usage | Use sunrise/sunset data to restrict to daylight hours, take average of kW over these hours, then do the same for nighttime and take the ratio |
| 11 | Percent change in kW sunrise | whole building | Rate of change of usage reflects solar photovoltaic system generation starting | Use sunrise/sunset data to select hour of sunrise, average kW in the two hours that precedes that hour and the two hours succeeding that hour, and calculate the percent change. |
| 12 | Percent change in kW sunset | whole building | Rate of change of usage reflects solar photovoltaic system generation stopping | Use sunrise/sunset data to select hour of sunset, average kW in the two hours that precedes that hour and the two hours succeeding that hour, and calculate the percent change. |
| 13 | Change in kW sunrise | channel 2 | Change of usage reflects solar photovoltaic system generation starting. use absolute not percentage change because of zero values in channel 2. | Use sunrise/sunset data to select hour of sunrise, average kW in the two hours that precedes that hour, and the two hours succeeding that hour and calculate the difference by subtracting the earlier time period from the later. |
| 14 | Change in kW sunset | channel 2 | Change of usage reflects solar photovoltaic system generation stopping. Use absolute not percentage change because of zero values in channel 2. | Use sunrise/sunset data to select hour of sunset, average kW in the two hours that precedes that hour, and the two hours succeeding that hour and calculate the difference by subtracting the earlier time period from the later. |
| 15 | Daily average weather and kW correlation during daytime | whole building | Weather attributes are correlated with usage for solar photovoltaic customers. Try day values in case hourly are too noisy. | Use cross-correlation with lag 0. Compute average of weather and demand during daylight hours each day then run cross-correlation over days. Create separate predictors for each weather attribute among: precipitation, cloud cover, temperature, relative humidity, dew point temperature, global horizontal irradiance (GHI), and direct normal irradiance (DNI). |
| 16 | Hourly average weather and kW correlation during daytime | whole building | Weather attributes are correlated with usage for solar photovoltaic customers | Use cross-correlation with lag 0. Restrict to daylight hours then run cross-correlation over hourly values. Create separate predictors for each weather attribute among: precipitation, cloud cover, temperature, relative humidity, dew point temperature, GHI, DNI. |

In some embodiments, the load predictors can comprise solar production correlated predictors. For example, in some embodiments, the load predictors can comprise a ratio of an average of daytime kW to nighttime kW for a whole building, and can be based on solar photovoltaic interconnected customers generally having lower daytime usage on average relative to nighttime usage. In this instance, the unauthorized access detection system and method can use sunrise/sunset data to restrict to daylight hours, take an average of kW over these hours, repeat for nighttime, and calculate the ratio.

method can use sunrise/sunset data to select hour of sunset, average kW in the two hours that precedes that hour and the two hours succeeding that hour, and calculate the percent change.

In some further embodiments, the load predictors can comprise a change in kW at sunrise from channel 2 data, where a change of usage reflects solar photovoltaic system generation starting, and where an absolute not percentage change is used because of zero values in channel 2. In this instance, the unauthorized access detection system and method can use sunrise/sunset data to select hour of sunrise, average kW in the two hours that precedes that hour, and the two hours succeeding that hour, and processing the difference by subtracting the earlier time period from the later.

In some further embodiments, the load predictors can comprise a change in kW sunset channel 2, where the change of usage reflects solar photovoltaic system generation stopping, and where absolute and not percentage change is used because of zero values in channel 2 data. In this instance, the unauthorized access detection system and method can use sunrise/sunset data to select hour of sunset, average kW in the two hours that precedes that hour, and the two hours succeeding that hour, and calculate the difference by subtracting the earlier time period from the later.

In some further embodiments, the load predictors can comprise a daily average weather and kW correlation during daytime for a whole building, where weather attributes are correlated with usage for solar photovoltaic customers. In some embodiments, day values can be used in place of hourly values, and cross-correlation with lag of zero. In some embodiments, the average of weather and demand during daylight hours each day can be calculated and cross-correlated over days.

In some embodiments, the load predictors can comprise hourly average weather and kW correlation during daytime for a whole building, where weather attributes are correlated with usage for solar photovoltaic customers. In some embodiments, cross-correlation can be used with lag of zero with a restricting to daylight hours, and cross-correlation over hourly values. Further, separate predictors for each weather attribute can be calculated based on precipitation, cloud cover, temperature, relative humidity, dew point temperature, global horizontal irradiance (GHI), and direct normal irradiance (DNI).

In some embodiments of the invention, the unauthorized access detection system and method can utilize machine learning to select the best performing predictors. For example, in some embodiments, the unauthorized access detection system and method can use least absolute shrinkage and selection operator (Lasso) regression as a model fitting process used to develop regression models, where a set of predictors and their covariates are selected from a set of potential predictors and a functional form is selected for each predictor. In some embodiments, the Lasso is able to improve both accuracy and interpretability by keeping the sum of the absolute value of the regression coefficients below a fixed value. This forces some coefficients of some predictors to be set to zero, essentially excluding those predictors.

TABLE 3

Predictors and coefficients selected by Lasso regression, single family homes

| Predictor | Channel | Coefficient |
|---|---|---|
| (Intercept) | NA | 7.194 |
| Average daytime kW | Whole building | 0.254 |
| Average minimum daytime kW | Whole building | −0.487 |
| Minimum daytime kW | Whole building | 1.138 |
| Maximum daytime kW | Whole building | −0.037 |
| Maximum daytime kW | Channel 2 | −0.393 |
| Standard deviation of average daytime kW | Whole building | −0.407 |
| Standard deviation of average daytime kW | Channel 2 | 5.817 |
| N Hours of negative daytime kW | Whole building | 0.003 |
| N Hours of positive daytime kW | Channel 2 | −0.012 |
| Percent change in kW sunrise | Whole building | −0.017 |
| Absolute change in kW sunrise | Channel 2 | 2.701 |
| Absolute change in kW sunset | Channel 2 | 1.748 |
| Daily average precipitation and kW correlation during daytime | Whole building | −0.524 |
| Daily average relative humidity and kW correlation during daytime | Whole building | 2.768 |
| Daily average relative dew point and kW correlation during daytime | Whole building | 0.951 |
| Daily average relative ghi and kW correlation during daytime | Whole building | 2.295 |
| Hourly precipitation and kW correlation during daytime | Whole building | 7.192 |
| Hourly cloud cover and kW correlation during daytime | Whole building | −4.596 |
| Hourly relative humidity and kW correlation during daytime | Whole building | 1.297 |
| Hourly dew point and kW correlation during daytime | Whole building | 0.470 |
| Hourly GHI and kW correlation during daytime | Whole building | −0.721 |
| Minimum load shape total kWh | Whole building | −0.030 |
| Minimum load shape number of hours of negative whole building kW | Whole building | −0.311 |
| Minimum load shape hourly GHI and kW correlation | Whole building | 3.699 |
| Minimum load shape hourly DNI and kW correlation | Whole building | −2.764 |

In reference to Table 3, showing predictors and coefficients selected by Lasso regression, with single family homes, after fitting the logistic model using the predictors selected by Lasso, two additional filters can be applied in order to minimize the number of false positives. First, in some embodiments, customers that do not have any hours with positive channel 2 values (i.e. customers who never export any energy back to the grid) can be removed from the list of possible unauthorized interconnections. Second, in some embodiments, customers can be required to have a negative correlation between hourly kW and irradiance (GHI), with a correlation of −0.186 or less. In some embodiments, this can minimize the possibility of flagging a customer incorrectly as having solar photovoltaic when they may just have a load shape that is similar to a solar photovoltaic customer with an undersized system. In one non-limiting example embodiments, the analysis dataset can be divided into separate training and testing datasets. In some embodiments, the training dataset can be used to select models, select predictors, and estimate model parameters. In some embodiments, the testing dataset can be used once the model has been selected and fitted to provide an unbiased estimate of model performance. In some embodiments, seventy percent of the analysis dataset can be used for training, and 30% is used for testing.

In some embodiments of the invention, the unauthorized access detection system and method can utilize any one or more of the previously described predictors to estimate the size of solar systems. Many of these predictors, such as maximum daytime electricity export magnitude, and maximum daytime whole building electricity demand can be plausibly related to the size of the solar photovoltaic system, and so can be relevant to this task. In some embodiments, when predictors have missing customers, values can be input using the median value of that predictor for all customers. In some embodiments of the invention, the unauthorized access detection system and method can determine system size (kW) as a function of the predictors using an Ordinary Least Squares (OLS) regression. In some embodiments, variable selection can be performed using a Lasso, as was done to select predictors to identify unauthorized interconnections. In some embodiments, following variable selection, the OLS model can be fit to the data using the most accurate predictors from the variable selection procedure.

In some embodiments of the invention, the unauthorized access detection system and method can utilize summary statistics for each customer's voltage data (including, but not limited to, average, minimum, maximum, and standard deviation of voltage), changes in voltage during sunrise/sunset hours, as well as correlations of daily and hourly voltage measurements with weather variables. In some embodiments, because the dataset can contain a mix of customers with 120V and 240V service, the voltage measurements can be initially normalized so that all analysis performed is based on a variation from the nominal service level. In some embodiments, for customers with 15 minute interval data, measurements can be averaged to an hourly level so that they can be consistent. The predictors selected in the final model specification are presented in Table 4.

TABLE 4

Voltage Model Predictors

| Name | Construction |
|---|---|
| Average daytime voltage | Use sunrise/sunset data to restrict to daylight hours. Take average voltage over these hours in each day, and then take average over days. |
| Average minimum daytime voltage | Use sunrise/sunset data to restrict to daylight hours. Take minimum voltage over these hours in each thy, and then take average of that minimum over days. |
| Average maximum daytime voltage | Use sunrise/sunset data to restrict to daylight hours. Take maximum voltage over these hours in each thy, and then take average of that maximum over days. |
| Average of standard deviation of daytime voltage | Restrict to daylight hours, take standard deviation of voltage for each day, and then take average of standard deviation over all days. |
| Minimum daytime voltage | Use sunrise/sunset data to restrict to daylight hours. Take minimum voltage over these hours for whole time period. |
| Maximum daytime voltage | Use sunrise/sunset data to restrict to daylight hours. Take maximum of voltage over these hours for whole time period. |
| Standard deviation of average daytime voltage | Restrict to daylight hours, average voltage value for each day, then take standard deviation of average voltage in those hours over all days. |
| Percent change in voltage sunrise | Use sunrise/sunset data to select hour of sunrise. Average voltage in the two hours that precedes that hour, and the two hours succeeding that hour and calculate the percent change. |
| Percent change in voltage sunset | Use sunrise/sunset data to select hour of sunset. Average voltage in the two hours that precedes that hour, and the two hours succeeding that hour and calculate the percent change. |
| Change in voltage Sunrise | Use sunrise/sunset data to select hour of sunrise. Average voltage in the two hours that precedes that hour, and the two hours succeeding that hour and calculate the difference by subtracting the earlier time period from the latter. |
| Change in voltage sunset | Use sunrise/sunset data to select hour of sunset. Average voltage in the two hours that precedes that hour, and the two hours succeeding that hour and calculate the difference by subtracting the earlier time period from the latter. |
| Ratio of average daytime voltage to nighttime voltage | Use sunrise/sunset data to restrict to daylight hours. Take average voltage over these hours. Then do the same for nighttime and take the ratio |
| Daily average precipitation and voltage correlation during daytime | Use cross-correlation with lag 0. Compute average of precipitation and voltage during daylight hours each day then run cross-correlation over days. |
| Daily average cloud cover and voltage correlation during daytime | Use cross-correlation with lag 0. Compute average of cloud cover and voltage during daylight hours each day then run cross-correlation over days. |
| Daily average temperature and voltage correlation during daytime | Use cross-correlation with lag 0. Compute average of temperature and voltage during daylight hours each day then run cross-correlation over days. |
| Daily average relative humidity and voltage correlation during daytime | Use cross-correlation with lag 0. Compute average of relative humidity and voltage during daylight hours each day then run cross-correlation over days. |
| Daily average dew point temperature and voltage correlation during daytime | Use cross-correlation with lag 0. Compute average of dew point temperature and voltage during daylight hours each day then run cross-correlation over days. |
| Daily average ghi and voltage correlation during daytime | Use cross-correlation with lag 0. Compute average of GHI and voltage during daylight hours each day then run cross-correlation over days. |
| Daily average dni and voltage correlation during daytime | Use cross-correlation with lag 0. Compute average of DNI and voltage during daylight hours each day then run cross-correlation over days. |
| Hourly average precipitation and voltage correlation during daytime | Use cross-correlation with lag 0. Restrict to daylight hours then run cross-correlation over hourly values. |
| Hourly average cloud cover and voltage correlation during daytime | Use cross-correlation with lag 0. Restrict to daylight hours then run cross-correlation over hourly values. |

TABLE 4-continued

Voltage Model Predictors

| Name | Construction |
| --- | --- |
| Hourly average temperature and voltage correlation during daytime | Use cross-correlation with lag 0. Restrict to daylight hours then run cross-correlation over hourly values. |
| Hourly average relative humidity and voltage correlation during daytime | Use cross-correlation with lag 0. Restrict to daylight hours then run cross-correlation over hourly values. |
| Hourly average dew point temperature and voltage correlation during daytime | Use cross-correlation with lag 0. Restrict to daylight hours then run cross-correlation over hourly values. |
| Hourly average ghi and voltage correlation during daytime | Use cross-correlation with lag 0. Restrict to daylight hours then run cross-correlation over hourly values. |
| Hourly average dm and voltage correlation during daytime | Use cross-correlation with lag 0. Restrict to daylight hours then run cross-correlation over hourly values. |

For example, in some embodiments of the invention, the unauthorized access detection system and method can utilize average daytime voltage, where sunrise/sunset data can be used to restrict to daylight hours, and the average voltage is used over these hours in each day, and then an average over days is calculated. In some further embodiments of the invention, the unauthorized access detection system and method can utilize average minimum daytime voltage, using sunrise/sunset data to restrict to daylight hours, taking a minimum voltage over these hours in each day, and then taking an average of that minimum over days. In some other embodiments of the invention, the unauthorized access detection system and method can utilize average maximum daytime voltage, using sunrise/sunset data to restrict to daylight hours, taking the maximum voltage over these hours in each day, and then taking the average of that maximum over days. In some further embodiments, the unauthorized access detection system and method can utilize the average of standard deviation of daytime voltage, restricting to daylight hours, taking the standard deviation of voltage for each day, and then taking the average of standard deviation over all days.

In some embodiments, the unauthorized access detection system and method can utilize minimum daytime voltage, using sunrise/sunset data to restrict to daylight hours, taking the minimum voltage over these hours for whole time period. In some further embodiments, the unauthorized access detection system and method can utilize maximum daytime voltage using sunrise/sunset data to restrict to daylight hours, taking the maximum of voltage over these hours for whole time period. In some other embodiments, the unauthorized access detection system and method can utilize standard deviation of average daytime voltage, restricting to daylight hours, averaging voltage values for each day, and taking the standard deviation of average voltage in those hours over all days.

In some embodiments of the invention, the unauthorized access detection system and method can utilize percent change in voltage sunrise, using sunrise/sunset data to select hour of sunrise, taking the average voltage in the two hours that precedes that hour, and the two hours succeeding that hour and calculate the percent change. In some embodiments of the invention, the unauthorized access detection system and method can utilize percent change in voltage sunset, using sunrise/sunset data to select hour of sunset, averaging voltage in the two hours that precedes that hour, and the two hours succeeding that hour and calculating the percent change. In some further embodiments, the unauthorized access detection system and method can utilize a change in voltage sunrise, using sunrise/sunset data to select hour of sunrise, averaging voltage in the two hours that precedes that hour, and the two hours succeeding that hour, and calculating the difference by subtracting the earlier time period from the latter.

In some other embodiments, the unauthorized access detection system and method can utilize change in voltage sunset, using sunrise/sunset data to select hour of sunset, averaging the voltage in the two hours that precedes that hour, and the two hours succeeding that hour, and calculating the difference by subtracting the earlier time period from the latter. In some embodiments, the unauthorized access detection system and method can utilize the ratio of average daytime voltage to nighttime voltage, and using the sunrise/sunset data to restrict to daylight hours, taking the average voltage over these hours, and repeating the same for nighttime and followed by calculation of the ratio.

In some further embodiments, the unauthorized access detection system and method can utilize daily average precipitation and voltage correlation during daytime, and using cross-correlation with lag of zero, and computing the average of precipitation and voltage during daylight hours each day then run cross-correlation over days. In some embodiments, the unauthorized access detection system and method can utilize daily average cloud cover and voltage correlation during daytime, and using cross-correlation with lag of zero, can compute the average of cloud cover and voltage during daylight hours each day followed by cross-correlation calculated over days. In some embodiments, the unauthorized access detection system and method can utilize daily average temperature and voltage correlation during daytime, and using the cross-correlation with lag of zero, can compute the average of temperature and voltage during daylight hours each day followed by cross-correlation over days.

In some further embodiments, the unauthorized access detection system and method can utilize daily average relative humidity and voltage correlation during daytime, and using cross-correlation with lag of zero, can compute the average of relative humidity and voltage during daylight hours each day followed by cross-correlation over days. In some embodiments, the unauthorized access detection system and method can utilize daily average dew point temperature and voltage correlation during daytime, using cross-correlation with lag of zero, computing the average of dew point temperature and voltage during daylight hours each day then calculating the cross-correlation over days. In some embodiments, the unauthorized access detection system and method can utilize daily average GHI and voltage correlation during daytime, using cross-correlation with lag of zero, computing the average of GHI and voltage during daylight hours each day, and then cross-correlating over days.

In some embodiments, the unauthorized access detection system and method can utilize daily average DNI and voltage correlation during daytime, using cross-correlation with lag of zero, computing the average of DNI and voltage during daylight hours each day, and the calculating the cross-correlation over days. In some further embodiments of the invention, the unauthorized access detection system and method can utilize hourly average precipitation and voltage correlation during daytime, calculating cross-correlation with lag of zero, restricting to daylight hours, and then cross-correlating over hourly values. In some other embodiments of the invention, the unauthorized access detection system and method can utilize hourly average cloud cover and voltage correlation during daytime, cross-correlating with lag of zero, restricting to daylight hours, and then cross-correlating over hourly values. In some embodiments, the unauthorized access detection system and method can utilize hourly average temperature and voltage correlation during daytime, using cross-correlation with lag of zero, restricting to daylight hours, and cross-correlating over hourly values.

In some further embodiments, the unauthorized access detection system and method can utilize hourly average relative humidity and voltage correlation during daytime, using cross-correlation with lag of zero, restricting to daylight hours, and then cross-correlating over hourly values. In some further embodiments of the invention, the unauthorized access detection system and method can utilize hourly average dew point temperature and voltage correlation during daytime, cross-correlating with lag of zero, and restricting to daylight hours, followed by cross-correlating over hourly values. In some other embodiments of the invention, the unauthorized access detection system and method can utilize hourly average GHI and voltage correlation during daytime, cross-correlating with lag of zero, restricting to daylight hours, followed by cross-correlating over hourly values. In some embodiments of the invention, the unauthorized access detection system and method can utilize hourly average DNI and voltage correlation during daytime, using cross-correlation with lag of zero, restricting to daylight hours, and then cross-correlation over hourly values. Some embodiments include solar photovoltaic underperformance model predictors, and any one or more of the predictors developed can be based on the channel 2 load data or the net load, and in at least some cases are normalized by weather variables.

Some embodiments include individual customer pre/post predictors (as shown in Table 5, and described below).

TABLE 5

Individual customer pre/post predictors

| | Name | Channel | Hypothesis | Construction |
|---|---|---|---|---|
| 1 | Normalized comparison of pre-post channel 2 output | Channel 2 | Total daily channel 2 output (normalized by system size) relative to customer's pre-failure output will drop post-failure | Average customer's normalized daily total channel 2 output and compares the 3, 5, 7, 14, and 21-day moving average of the difference to find the suspected failure date. Variable of interest is the difference in the pre/post value of the variable for the customer's own output. |
| 2 | Normalized comparison of pre-post channel 2 mean output | Channel 2 | Average daily channel 2 output (normalized by system size) relative to customer's pre-failure output will drop post-failure | Average customer's normalized daily average channel 2 output and compares the 3, 5, 7, 14, and 21-day moving average of the difference to find the suspected failure date. Variable of interest is the difference in the pre/post value of the variable for the customer's own output. |
| 3 | Normalized comparison of pre-post channel 1 mean output | Channel 1 | Average daily channel 1 output (normalized by system size) relative to customer's pre-failure output will drop post-failure | Average customer's normalized daily average channel 1 output and compares the 3, 5, 7, 14, and 21-day moving average of the difference to find the suspected failure date. Variable of interest is the difference in the pre/post value of the variable for the customer's own output. |
| 4 | Normalized comparison of pre-post channel 2 maximum output | Channel 2 | Maximum daily channel 2 output (normalized by system size) relative to customer's pre-failure output will drop post-failure | Average customer's normalized maximum channel 2 output and compares the 3, 5, 7, 14, and 21-day moving average of the difference to find the suspected failure date. Variable of interest is the difference in the pre/post value of the variable for the customer's own output. |
| 5 | Weather-normalized comparison of pre/post channel 2 average output by temperature, dew oint, relative humidity, cloud cover and ghi | Channel 2 | Relative performance of average daily channel 2 output divided by average value of each of the weather variables (as proxies for cloud cover or irradiance) compared to customer's pre-failure output will drop post-failure | Average customer's weather-normalized average channel 2 output and compares the 3, 5, 7, 14, and 21-day moving average of the difference to find the suspected failure date. Variable of interest is the difference in the pre/post value of the variable for the customer's own output. |

Some embodiments include a normalized comparison of pre-post channel 2 output based on the premise that total daily channel 2 output (normalized by system size) relative to customer's pre-failure output will drop post-failure. In this instance, the average customer's normalized daily total channel 2 output can be retrieved and the 3, 5, 7, 14, and 21-day moving average of the difference can be calculated to find the suspected failure date, where the variable of interest is the difference in the pre/post value of the variable for the customer's own output.

In some further embodiments, the unauthorized access detection system and method can utilize a normalized comparison of pre-post channel 2 mean output, where the average daily channel 2 output (normalized by system size) relative to customer's pre-failure output can drop post-failure. Using the average customer's normalized daily average channel 2 output, the 3, 5, 7, 14, and 21-day moving average of the difference is compared to find the suspected failure date, where the variable of interest is the difference in the pre/post value of the variable for the customer's own output.

In some further embodiments, the unauthorized access detection system and method can utilize a normalized comparison of pre-post channel 1 mean output, where the average daily channel 1 output (normalized by system size) relative to customer's pre-failure output can drop post-failure. The average customer's normalized daily average channel 1 output for the 3, 5, 7, 14, and 21-day moving average of the difference can be compared to find the suspected failure date. In some embodiments, the variable of interest is the difference in the pre/post value of the variable for the customer's own output.

In some other embodiments, the unauthorized access detection system and method can utilize a normalized comparison of pre-post channel 2 maximum output, where the maximum daily channel 2 output (normalized by system size) relative to customer's pre-failure output can drop post-failure. In some embodiments, the average customer's normalized maximum channel 2 output can be used to compare the 3, 5, 7, 14, and 21-day moving average of the difference to find the suspected failure date. In some embodiments, the variable of interest is the difference in the pre/post value of the variable for the customer's own output.

In some further embodiments of the invention, the unauthorized access detection system and method can utilize weather-normalized comparison of pre/post channel 2 average output by temperature, dew point, relative humidity, cloud cover and GHI. In this instance, the relative performance of average daily channel 2 output divided by average value of each of the weather variables (as proxies for cloud cover or irradiance) when compared to customer's pre-failure output can drop post-failure. In this instance, the average customer's weather-normalized average channel 2 output is obtained and the 3, 5, 7, 14, and 21-day moving average of the difference compared to find the suspected failure date. The variable of interest is the difference in the pre/post value of the variable for the customer's own output.

TABLE 6

Population difference-in-difference predictors

| | Name | Channel | Hypothesis | Construction |
|---|---|---|---|---|
| 1 | Normalized comparison of pre-post channel 2 output | Channel 2 | Total daily channel 2 output (normalized by system size) relative to all customers can drop post-failure | Average all customers' normalized daily total channel 2 output and compare the 3, 5, 7, 14, and 21-day moving average of the difference between the customer and all customers to find the suspected failure date. Variable of interest is the difference in the pre/post difference between the customer and their average population profile. |
| 2 | Normalized comparison of pre-post channel 2 mean output | Channel 2 | Average daily channel 2 output (normalized by system size) relative to all customers can drop post-failure | Average all customers' normalized average total channel 2 output and compare the 3, 5, 7, 14, and 21-day moving average of the difference between the customer and all customers to find the suspected failure date. Variable of interest is the difference in the pre/post difference between the customer and their average population profile. |
| 3 | Normalized comparison of pre-post channel 1 mean output | Channel 1 | Average daily channel 1 output (normalized by system size) relative to all customers can drop post-failure | Average all customers' normalized average total channel 1 output and compare the 3, 5, 7, 14, and 21-day moving average of the difference between the customer and all customers to find the suspected failure date. Variable of interest is the difference in the pre/post difference between the customer and their average population profile. |
| 4 | Normalized comparison of pre-post channel 2 maximum Output | Channel 2 | Maximum daily channel 2 output (normalized by system size) relative to all customers can drop post-failure | Average all customers' normalized maximum channel 2 output and compare the 3, 5, 7, 14, and 21-day moving average of the difference between the customer and all customers to find the suspected failure date. Variable of interest is the difference in the pre/post difference between the customer and their average population profile. |
| 5 | Weather-normalized comparison of pre/post channel 2 average output | Channel 2 | Relative performance of average daily channel 2 output divided by average value of each of the weather variables (as proxies for cloud cover or | Average all customers' weather-normalized average channel 2 output and compare the 3, 5, 7, 14, and 21-day moving average of the difference between the customer and all customers to find the |

TABLE 6-continued

Population difference-in-difference predictors

| Name | Channel | Hypothesis | Construction |
|---|---|---|---|
| by temperature, dew point, relative humidity, cloud cover and ghi | | irradiance) compared to all customers can drop post-failure | suspected failure date. Variable of interest is the difference in the pre/post difference between the customer and their average population profile. |

Table 6 shows population difference-in-difference predictors. In some embodiments of the invention, the unauthorized access detection system and method can utilize a normalized comparison of pre-post channel 2 output, where a total daily channel 2 output (normalized by system size) relative to all customers can drop post-failure. In this instance, taking the average all customers' normalized daily total channel 2 output and comparing the 3, 5, 7, 14, and 21-day moving average of the difference between the customer and all customers can be used to find the suspected failure date. In some embodiments, the variable of interest is the difference in the pre/post difference between the customer and their average population profile.

In some further embodiments of the invention, the unauthorized access detection system and method can utilize normalized comparison of pre-post channel 2 mean output, where the average daily channel 2 output (normalized by system size) relative to all customers can drop post-failure. In this instance, the average of all customers' normalized average total channel 2 output can be compared where the 3, 5, 7, 14, and 21-day moving average of the difference between the customer and all customers can be used to find the suspected failure date. In some embodiments, the variable of interest is the difference in the pre/post difference between the customer and their average population profile.

In some other embodiments of the invention, the unauthorized access detection system and method can utilize the normalized comparison of pre-post channel 1 mean output, where the average daily channel 1 output (normalized by system size) relative to all customers can drop post-failure. In this instance, the average of all customers' normalized average total channel 1 output can be used to compare the 3, 5, 7, 14, and 21-day moving average of the difference between the customer and all customers, and used to find the suspected failure date. In some embodiments, the variable of interest is the difference in the pre/post difference between the customer and their average population profile.

In some embodiments of the invention, the unauthorized access detection system and method can utilize the normalized comparison of pre-post channel 2 maximum output, where the maximum daily channel 2 output (normalized by system size) relative to all customers can drop post-failure. In this instance, the average of all customers' normalized maximum channel 2 output can be used to compare the 3, 5, 7, 14, and 21-day moving average of the difference between the customer and all customers to find the suspected failure date. In some embodiments, the variable of interest is the difference in the pre/post difference between the customer and their average population profile.

In some embodiments, the unauthorized access detection system and method can utilize the weather-normalized comparison of pre/post channel 2 average output by temperature, dew point, relative humidity, cloud cover and/or GHI, where the relative performance of average daily channel 2 output divided by average value of each of the weather variables (as proxies for cloud cover or irradiance) compared to all customers can drop post-failure. In this instance, the average of all customers' weather-normalized average channel 2 output can be used to compare the 3, 5, 7, 14, and 21-day moving average of the difference between the customer and all customers to find the suspected failure date. In some embodiments, the variable of interest is the difference in the pre/post difference between the customer and their average population profile.

TABLE 7 nearest neighbors difference-in-difference predictors

| | Name | Channel | Hypothesis | Construction |
|---|---|---|---|---|
| 1 | Normalized comparison of pre-post channel 2 output | Channel 2 | Total daily channel 2 output (normalized by system size) relative to closest neighbors can drop post-failure | Construct a 'neighborhood' of 50 closest neighbors to customer suspected of failing. Average their normalized daily total channel 2 output and compare the 3-day moving average of the difference between the customer and their neighborhood to find the suspected failure date. Variable of interest is the difference in the pre/post difference between the customer and their average neighborly profile. |
| 2 | Normalized comparison of pre-post channel 2 mean output | Channel 2 | Average daily channel 2 output (normalized by system size) relative to closest neighbors can drop post-failure | Construct a 'neighborhood' of 50 closest neighbors to customer suspected of failing. Average their normalized average total channel 2 outputs and compare the 3-day moving average of the difference between the customer and their neighborhood to find the suspected failure date. Variable of interest is the difference in the pre/post difference between the customer and their average neighborly profile. |

TABLE 7-continued nearest neighbors difference-in-difference predictors

| | Name | Channel | Hypothesis | Construction |
|---|---|---|---|---|
| 3 | Normalized comparison of pre-post channel 1 mean output | Channel 1 | Average daily channel 1 output (normalized by system size) relative to closest neighbors can drop post-failure | Construct a 'neighborhood' of 50 closest neighbors to customer suspected of failing. Average their normalized average total channel 1 output and compare the 3-day moving average of the difference between the customer and their neighborhood to find the suspected failure date. Variable of interest is the difference in the pre/post difference between the customer and their average neighborly profile. |
| 4 | Normalized comparison of pre-post channel 2 maximum output | Channel 2 | Maximum daily channel 2 output (normalized by system size) relative to closest neighbors can drop post-failure | Construct a 'neighborhood' of 50 closest neighbors to customer suspected of failing. Average their normalized maximum channel 2 output and compare the 3-day moving average of the difference between the customer and their neighborhood to find the suspected failure date. Variable of interest is the difference in the pre/post difference between the customer and their average neighborly profile. |
| 5 | Weather-normalized comparison of pre/post channel 2 average output by temperature, dew point, relative humidity, cloud cover and ghi | Channel 2 | Relative performance of average daily channel 2 output divided by average value of each of the weather variables (as proxies for cloud cover or irradiance) compared to closest neighbors can drop post-failure | Construct a 'neighborhood' of 50 closest neighbors to customer suspected of failing. Average their weather-normalized average channel 2 output and compare the 3-day moving average of the difference between the customer and their neighborhood to find the suspected failure date. Variable of interest is the difference in the pre/post difference between the customer and their average neighborly profile. |

Table 7 shows nearest neighbors difference-in-difference predictors. In some embodiments of the invention, the unauthorized access detection system and method can utilize a normalized comparison of pre-post channel 2 output, where the total daily channel 2 output (normalized by system size) relative to closest neighbors can drop post-failure. In this instance, the unauthorized access detection system and method can construct a 'neighborhood' of fifty closest neighbors to a customer suspected of failing. Further, in some embodiments, an average of their normalized daily total channel 2 output can be calculated and used to compare the 3-day moving average of the difference between the customer and their neighborhood to find the suspected failure date. In some embodiments, the variable of interest is the difference in the pre/post difference between the customer and their average neighborly profile.

In some other embodiments of the invention, the unauthorized access detection system and method can utilize the normalized comparison of pre-post channel 2 mean output, where the average daily channel 2 output (normalized by system size) relative to closest neighbors can drop post-failure. In some embodiments, the unauthorized access detection system and method can construct a 'neighborhood' of fifty closest neighbors to a customer suspected of failing. Further, in some embodiments, an average their normalized average total channel 2 outputs can be calculated and used to compare the 3-day moving average of the difference between the customer and their neighborhood to find the suspected failure date. In some embodiments, the variable of interest is the difference in the pre/post difference between the customer and their average neighborly profile.

In some further embodiments of the invention, the unauthorized access detection system and method can utilize the normalized comparison of pre-post channel 1 mean output, where the average daily channel 1 output (normalized by system size) relative to closest neighbors can drop post-failure. In this instance, the unauthorized access detection system and method can construct a 'neighborhood' of fifty closest neighbors to a customer suspected of failing. Further, in some embodiments, an average of their normalized average total channel 1 output can be calculated and used to compare the 3-day moving average of the difference between the customer and their neighborhood to find the suspected failure date. In some embodiments, the variable of interest is the difference in the pre/post difference between the customer and their average neighborly profile.

In some further embodiments, the unauthorized access detection system and method can utilize the normalized comparison of pre-post channel 2 maximum output, where the maximum daily channel 2 output (normalized by system size) relative to closest neighbors can drop post-failure. In this instance, the unauthorized access detection system and method can construct a 'neighborhood' of fifty closest neighbors to customer suspected of failing. In some embodiments, an average of their normalized maximum channel 2 output can be calculated and compared to the 3-day moving average of the difference between the customer and their neighborhood to find the suspected failure date. In some embodiments, the variable of interest is the difference in the pre/post difference between the customer and their average neighborly profile.

In some other embodiments, the unauthorized access detection system and method can utilize the weather-normalized comparison of pre/post channel 2 average output by temperature, dew point, relative humidity, cloud cover and GHI, where the relative performance of average daily channel 2 output divided by average value of each of the weather variables (as proxies for cloud cover or irradiance) compared to closest neighbors can drop post-failure. In some embodiments, the unauthorized access detection system and method can construct a 'neighborhood' of fifty closest neighbors to customer suspected of failing. Further, an average their weather-normalized average channel 2 output can be calculated and compared to the 3-day moving average of the difference between the customer and their neighborhood to find the suspected failure date. In some embodiments, the variable of interest is the difference in the pre/post difference between the customer and their average neighborly profile.

Similar to the unauthorized interconnection detection algorithm development process, in some embodiments, the combination of predictors that has the most predictive power with the least redundancy was determined by using a Lasso regression. This method was applied to each analysis dataset, yielding a different collection of predictors for each level of post-failure data tested. The selected predictors were then used in a logistic regression to produce a model for predicting whether a given customer has an underperforming solar photovoltaic system. The final model for each level of post-failure data was then tested using the portion of the analysis dataset that was withheld from the training process.

Table 8 shows a summary of the process for determining unauthorized interconnections and characteristics using the load predictors and method shown and described related to Tables 1 to 7. In some embodiments, the process to determine whether a customer is using an unauthorized interconnection to photovoltaic equipment can include steps 1-5, and including sub-steps 1.1, 1.2, 1.3, 2.1, 2.2, 3, 3.1, 4.1, 4.2, and 5.1 as detailed below with input, input data and rules as shown and described earlier.

TABLE 8

Unauthorized identification methods

| Steps | Sub-steps | Input | Input Data Source | Rules | Output |
|---|---|---|---|---|---|
| 1. Data pull and Data Cleaning | 1.1 Pull 3 months of interval data | | Utility | | |
| | 1.2 Pull weather data (including solar radiation data) | | Utility | | |
| | 1.3 Pull sunrise/sunset data | | Publicly available (NOAA) | | |
| 2. Generate Predictors | 2.1 Calculate simple predictors based on interval data alone | Load data | Step 1.1 | Use sunrise/sunset data to restrict to daylight hours. Take average of kW over these hours in each day, and then take average over days. This is performed separately for whole building (channel 1 reading-channel 2 reading) and for channel 2 only. | Average daytime kW |
| | | | | Use sunrise/sunset data to restrict to daylight hours. Take min of kW over these hours in each day, and then take average of that minimum over days. This is performed for whole building (channel 1 reading-channel 2 reading) only. | Average minimum daytime kW |
| | | | | Use sunrise/sunset data to restrict to daylight hours. Take min of kW over these hours for whole time period. This is performed for whole building (channel 1 reading-channel 2 reading) only. | Minimum daytime kW |
| | | | | Use sunrise/sunset data to restrict to daylight hours. Take max of kW over these hours for whole time period. This is performed for whole building (channel 1 reading-channel 2 reading), as well as for channel 2 only. | Maximum daytime kW |
| | | | | Restrict to daylight hours, average value for each day. Then take standard deviation of average demand in those hours over all days. This is | Standard deviation of average daytime kW |

TABLE 8-continued

Unauthorized identification methods

| Steps | Sub-steps | Input | Input Data Source | Rules | Output |
|---|---|---|---|---|---|
| | | | | performed separately for whole building (channel 1 reading-channel 2 reading) and for channel 2 only. | |
| | | | | Use interval data to count # hours with negative values. | "N" Hours of negative daytime kW |
| | | | | Use interval data to count # hours with positive values in channel 2. | "N" Hours of positive daytime kW |
| | | | | Take minimum whole building consumption in each hour over the three month period to yield a synthetic minimum load shape. Then sum over 24 hours to yield a kWh value. | Minimum load shape total kWh |
| | | | | Take minimum whole building consumption in each hour over the three month period to yield a synthetic minimum load shape. Count # hours with negative values. | Minimum load shape number of hours of negative whole building kW |
| | 2.2 Calculate predictors based on interval data correlated with sunrise/sunset and weather data | Load data, sunrise/sunset data, weather data | from steps 1.1, 1.2, and 1.3 | Use sunrise/sunset data to select hour of sunrise. Average kW in the two hours that precedes that hour and the two hours succeeding that hour, and calculate the percent change. | Percent change in kW Sunrise |
| | | | | Use sunrise/sunset data to select hour of sunrise. Average kW in the two hours preceding that hour, and the two hours succeeding that hour and calculate the difference by subtracting the earlier time period from the later. | Absolute change in kW Sunrise |
| | | | | Use sunrise/sunset data to select hour of sunset. Average kW in the two hours preceding that hour, and the two hours succeeding that hour and calculate the difference by subtracting the earlier time period from the later. | Absolute Change in kW Sunset |
| | | | | Use cross-correlation with lag 0. Compute average of precipitation and demand during daylight hours each day then run cross-correlation over days. | Daily average precipitation and kW correlation during daytime. |
| | | | | Use cross-correlation with lag 0. Compute average of relative humidity and demand during daylight hours each day then run cross-correlation over days. | Daily average relative humidity and kW correlation during daytime. |
| | | | | Use cross-correlation with lag 0. Compute average of dew point temperature and demand during daylight hours each day then run cross-correlation over days. | Daily average relative dew point and kW correlation during daytime. |
| | | | | Use cross-correlation with lag 0. Compute average of GHI and demand during | Daily average relative GHI and kW |

TABLE 8-continued

Unauthorized identification methods

| Steps | Sub-steps | Input | Input Data Source | Rules | Output |
|---|---|---|---|---|---|
| | | | | daylight hours each day then run cross-correlation over days. | correlation during daytime. |
| | | | | Use cross-correlation with lag 0. Restrict to daylight hours then run cross-correlation over hourly values. | Hourly precipitation and kW correlation during daytime. |
| | | | | Use cross-correlation with lag 0. Restrict to daylight hours then run cross-correlation over hourly values. | Hourly cloud cover and kW correlation during daytime. |
| | | | | Use cross-correlation with lag 0. Restrict to daylight hours then run cross-correlation over hourly values. | Hourly relative humidity and kW correlation during daytime |
| | | | | Use cross-correlation with lag 0. Restrict to daylight hours then run cross-correlation over hourly values. | Hourly dew point and kW correlation during daytime |
| | | | | Use cross-correlation with lag 0. Restrict to daylight hours then run cross-correlation over hourly values. | Hourly GHI and kW correlation during daytime |
| | | | | Take minimum whole building consumption in each hour over the three month period to yield a synthetic minimum load shape. Also take GHI value associated with each minimum hour. Use cross-correlation with lag 0. Then run cross-correlation over hourly values. | Minimum load shape hourly GHI and kW correlation |
| | | | | Take minimum whole building consumption in each hour over the three month period to yield a synthetic minimum load shape. Also take DNI value associated with each minimum hour. Use cross-correlation with lag 0. Then run cross-correlation over hourly values. | Minimum load shape hourly DNI and kW correlation |
| 3. Apply Logistic Regression Model | 3.1 Predict likelihood of photovoltaic ownership | Predictors | from steps 2.1 and 2.2 | Use calculated predictors along with coefficients from final model specification | Probability of photovoltaic ownership |
| 4. Apply Additional Filters | 4.1 Exclude none exporters | N Hours of Negative daytime kW | from step 2.1 | Exclude customers with no hours of negative daytime kW | |
| | 4.2 Only include customers with significantly negative correlation between irradiance and load | Hourly GHI and kW Correlation During daytime | from step 2.2 | Only include customers with correlation of −0.186 or less | |
| 5. Classify Customers Based on Threshold Level | 5.1 Determine whether customer is UI based on chosen threshold level | Probability of photovoltaic ownership and threshold | from step 3.1 and user-defined input | Establish minimum probability of photovoltaic ownership (based on tolerance for false positives vs. false negatives) and determine | |

TABLE 8-continued

Unauthorized identification methods

| Steps | Sub-steps | Input | Input Data Source | Rules | Output |
|---|---|---|---|---|---|
| | | | | which customers fall within criteria | |

Some embodiments can include variations of the order of any steps of the methods described herein. Further, in some embodiments, one or more of the rules described can be used with other steps or combinations of steps, or may not be used for any one step. In some further embodiments, any of the unauthorized identification methods described herein can utilize larger or smaller numbers of customer data and/or with data from more or less numbers of customer meters. In some further embodiments, any of the input variable data from customers can vary from those described for any of the methods described herein. For example, in some embodiments, the interval time or period for customer meter data can be increased or reduced from that described earlier. Moreover, in some embodiments, customer data can include start or end dates that with time periods that are greater or smaller than those described, and/or can include intermittent data received intermittently over a specified period of time. In some embodiments, voltage or other power data can include characteristics, limits, or behavior that is different from that described earlier.

At least some embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A computer-implemented method of monitoring unauthorized electrical grid access comprising:
    operating a hardware system with at least one processor executing instructions from a non-transitory computer-readable storage medium of an electrical grid access detection system, the instructions causing the at least one processor to:
    receive data from an electrical connection to an electrical component of the electric grid;
    retrieve customer energy data from at least one energy delivery server comprising one or more customer records of a customer's coupling to one or more energy delivery systems or networks;
    determine a net energy metering (NEM) status by establishing an indicator of net energy metering (NEM) access to the customer from the customer energy data;
    determine solar status by determining if the customer is a solar customer from the customer energy data;
    determine system size of the customer from the customer energy data,
    wherein system size determination includes at least one of: calculating a maximum export demand within a two month period; calculating a ratio between a maximum export demand and a recorded system size retrieved from the server for a net energy metering (NEM) customer; ranking the customer using a ratio between a maximum export demand and a recorded system size retrieved from the server for a net energy metering (NEM) customer and removing the top 1%; and calculating a demand/adjusted factor input variable; and
    prepare a determination of unauthorized interconnection of the customer based at least in part on the analysis of system size, solar status, and the customer's net energy metering (NEM) status.

2. The computer-implemented method of claim 1, wherein the customer energy data comprises two months of interval data.

3. The computer-implemented method of claim 1, wherein the customer energy data comprises a 15 minutes of maximum kWh within a two month period.

4. The computer-implemented method of claim 1, wherein the customer energy data comprises a total solar system size.

5. The computer-implemented method of claim 1, further comprising determining, from the customer energy data, at least one of average kWh export average, average daily, daytime or nighttime export, average daily daytime exporting hour, exporting days, daytime versus nighttime variance, first export day, and median daytime export variance.

6. The computer-implemented method of claim 1, wherein a process of determining the net energy metering (NEM) status includes retrieving information on customer's with a NEM rate, retrieving a service point ID, creating a net energy metering (NEM) flag, and retrieving a list of net energy metering (NEM) aggregated of a premises.

7. The computer-implemented method of claim 1, wherein the process of determining solar status includes a process of excluding non-exporters of solar generated energy.

8. The computer-implemented method of claim 1, wherein the process of determining solar status excludes net energy metering (NEM) aggregated customers.

9. The computer-implemented method of claim 1, wherein the process of determining solar status includes excluding customers with recently opened or recently closed service accounts.

10. The computer-implemented method of claim 5, wherein the process of determining solar status includes applying one or more rules defined by at least one of average kWh export average, average daily, daytime or nighttime export, average daily daytime exporting hour, exporting days, daytime versus nighttime variance, first export day, and median daytime export variance.

11. The computer-implemented method of claim 1, wherein system size determination includes calculating a maximum export demand within a two month period, calculating a ratio between the maximum export demand and a recorded system size retrieved from the server for a net energy metering (NEM) customer, ranking the customer using the ratio and removing the top 1%, calculating a demand/adjusted factor input variable, and processing an estimate of system size for all customers identified to have solar.

12. The computer-implemented method of claim 1, wherein a process of determination of unauthorized interconnection of the customer includes pulling a record of list of customers identified to have solar but not net energy metering (NEM), and matching the record with estimated system size.

13. A computer program product comprising:
one or more non-transitory computer-readable storage medium, storing instructions that, when executed, cause a processor to perform monitoring of unauthorized electrical grid access comprising the steps of:
receive data from an electrical connection to an electrical component of the electric grid;
coupling to and retrieving customer energy data from at least one energy delivery server comprising one or more customer records of a customer's coupling to one or more energy delivery systems or networks;
determining a net energy metering (NEM) status by establishing an indicator of net energy metering (NEM) access to the customer from the customer energy data;
determining solar status by determining if the customer is a solar customer from the customer energy data;
determine system size of the customer from the customer energy data, wherein system size determination includes at least one of: calculating a maximum export demand within a two month period; calculating a ratio between a maximum export demand and a recorded system size retrieved from the server for a net energy metering (NEM) customer; ranking the customer using a ratio between a maximum export demand and a recorded system size retrieved from the server for a net energy metering (NEM) customer and removing the top 1%; and calculating a demand/adjusted factor input variable; and preparing a determination of unauthorized interconnection of the customer based at least in part on the analysis of system size, solar status, and the customer's net energy metering (NEM) status.

14. The computer program product of claim 13, further comprising determining, from the customer energy data, at least one of average kWh export average, average daily, daytime or nighttime export, average daily daytime exporting hour, exporting days, daytime versus nighttime variance, first export day, and median daytime export variance.

15. The computer program product of claim 13, wherein system size determination includes calculating a maximum export demand within a two month period, calculating a ratio between the maximum export demand and a recorded system size retrieved from the server for a net energy metering (NEM) customer, ranking the customer using the ratio and removing the top 1%, calculating a demand/adjusted factor input variable, and processing an estimate of system size for all customers identified to have solar.

16. A hardware system for monitoring unauthorized electrical grid access comprising:
at least one processor executing instructions from a non-transitory computer-readable storage medium of an electrical grid fault detection system, the instructions causing a processor to:
receive data from an electrical connection to an electrical component of the electric grid;
couple to and retrieve customer energy data from at least one energy delivery server comprising one or more customer records of a customer's coupling to one or more energy delivery systems or networks;
determine a net energy metering (NEM) status by establishing an indicator of net energy metering (NEM) access to the customer from the customer energy data;
determine solar status by determining if the customer is a solar customer from the customer energy data;
determine system size of the customer from the customer energy data, wherein system size determination includes at least one of: calculating a maximum export demand within a two month period; calculating a ratio between a maximum export demand and a recorded system size retrieved from the server for a net energy metering (NEM) customer; ranking the customer using a ratio between a maximum export demand and a recorded system size retrieved from the server for a net energy metering (NEM) customer and removing the top 1%; and calculating a demand/adjusted factor input variable;
and
prepare a determination of unauthorized interconnection of the customer based at least in part on the analysis of system size, solar status, and the customer's net energy metering (NEM) status.

17. The hardware system of claim 16, further comprising determining, from the customer energy data, at least one of average kWh export average, average daily, daytime or nighttime export, average daily daytime exporting hour, exporting days, daytime versus nighttime variance, first export day, and median daytime export variance.

18. The hardware system of claim 16, wherein a process of determining the net energy metering (NEM) status includes retrieving information on customer's with a NEM rate, retrieving a service point ID, creating a net energy metering (NEM) flag, and retrieving a list of net energy metering (NEM) aggregated of a premises.

19. The hardware system of claim 16, wherein a process of determination of unauthorized interconnection of the customer includes pulling a record of list of customers identified to have solar but not net energy metering (NEM), and matching the record with estimated system size.

20. The hardware system of claim 16, wherein system size determination includes calculating a maximum export demand within a two month period, calculating a ratio between the maximum export demand and a recorded system size retrieved from the server for a net energy metering (NEM) customer, ranking the NEM customer using the ratio and removing the top 1%, calculating a demand/adjusted factor input variable, and processing an estimate of system size for all customers identified to have solar.

* * * * *